(12) United States Patent
Wocke et al.

(10) Patent No.: US 7,603,329 B2
(45) Date of Patent: Oct. 13, 2009

(54) DATA SET MODIFICATION USING TRAINING ALGORITHM THAT GROWS THE DATA SET

(75) Inventors: Carl Wocke, Melbourne (AU); Riaan Brits, Melbourne (AU)

(73) Assignee: Raptor International, Inc., Longmont, CO (US)

( * ) Notice: Subject to any disclaimer, the term of this patent is extended or adjusted under 35 U.S.C. 154(b) by 815 days.

(21) Appl. No.: 10/564,105

(22) PCT Filed: Jul. 9, 2003

(86) PCT No.: PCT/AU03/00881

§ 371 (c)(1),
(2), (4) Date: Jan. 9, 2006

(87) PCT Pub. No.: WO2005/006249

PCT Pub. Date: Jan. 20, 2005

(65) Prior Publication Data

US 2006/0161814 A1    Jul. 20, 2006

(30) Foreign Application Priority Data

Jul. 9, 2003    (AU)    ............................... 2003236594

(51) Int. Cl.
*G06F 15/18*    (2006.01)
(52) U.S. Cl. ..................................................... 706/16
(58) Field of Classification Search .................. 706/14, 706/16, 25
See application file for complete search history.

(56) References Cited

U.S. PATENT DOCUMENTS 5,634,087 A * 5/1997 Mammone et al. ............ 706/25
5,845,285 A * 12/1998 Klein .......................... 707/101
5,897,627 A    4/1999 Leivian et al.
6,812,926 B1   11/2004 Rugge
7,051,029 B1 *  5/2006 Fayyad et al. .................. 707/10
2002/0091655 A1  7/2002 Agrafiotis et al.

FOREIGN PATENT DOCUMENTS

WO    WO 02/056248    7/2002
WO    2004/063769     7/2004

OTHER PUBLICATIONS

International Search Report dated Sep. 8, 2003, for application PCT/AU03/00881 filed on Jul. 9, 2003.

* cited by examiner

*Primary Examiner*—David R Vincent
*Assistant Examiner*—Ola Olude-Afolabi
(74) *Attorney, Agent, or Firm*—Christine Meis McAuliffe Holme Roberts & Owen, LLP

(57) ABSTRACT

A system and method of computer data analysis using neural networks. In one embodiment of the invention, the system and method includes generating a data representation using a data set, the data set including a plurality of attributes, wherein generating the data representation includes: modifying the data set using a training algorithm, wherein the training algorithm includes growing the data set; and performing convergence testing, wherein convergence testing checks for convergence of the training algorithm, and wherein the modifying of the data set is repeated until convergence of the training algorithm occurs; and displaying one or more subsets of the data set using the data representation. In one embodiment, the data representation is a knowledge filter that includes a representation of an input data set. The representation may be constructed during a training process. In one exemplary embodiment, the training process uses unsupervised neural networks to create the data representation. In general terms, the data representation may include a number of coupled, or connected, hexagons called nodes. Considering relevant attributes, two nodes that are closer together may be more similar than two nodes that are further apart.

49 Claims, 9 Drawing Sheets

FIG. 7

DATA SET MODIFICATION USING TRAINING ALGORITHM THAT GROWS THE DATA SET

CLAIM TO FOREIGN PRIORITY

This Application claims the benefit of priority of PCT Application Serial No. PCT/AU03/000881 filed Jul. 9, 2003.

FIELD OF THE INVENTION

The present invention relates generally to computer systems, and more specifically, to using neural network applications to perform data mining and data analysis.

BACKGROUND OF THE INVENTION

Neural networks and neural network applications are known in the art. Experiments in biological neural network have determined that the strength of synaptic connections between neurons in the brain is a function of the frequency of excitation. Neurons are presented with numerous stimuli (input signals, produced by some external action, such as the eye viewing an object, or the skin sensing temperature). After sufficient exposure to sensorial stimuli from an environment, a collection of neurons will start to react differently, depending on the strength of the individual stimuli. One effect of this process is that certain neurons, or collections of neurons, are more likely to fire when presented with certain patterns rather than others. The same collection of neurons is also sensitive to patterns that are fairly similar. This sensitivity can over time be construed as 'learning' a certain part of an input space.

T. Kohonen has created one mathematical abstraction of the above-described neural network process, known as the Kohonen algorithm, which is discussed in detail in various writings. The Kohonen algorithm has been used to model simple models of the cortex and has also been used in other applications. However, present applications have not addressed all of the needs related to computer implemented data analysis using neural network models.

SUMMARY OF THE INVENTION

According to one embodiment of the invention, a method of computer data analysis using neural networks is disclosed. The method includes generating a data representation using a data set, the data set including a plurality of attributes, wherein generating the data representation includes: modifying the data set using a training algorithm, wherein the training algorithm includes growing the data set; and performing convergence testing, wherein convergence testing checks for convergence of the training algorithm, and wherein the modifying of the data set is repeated until convergence of the training algorithm occurs; and displaying one or more subsets of the data set using the data representation. The data representation may include a latent model. A latent model may include a simplified model of the original data or data set, representing trends and other information which may not have been present or accessible in the original data. This may be done by constructing a new set of data vectors, initialized through a principle plane initialization, that are adapted to become more similar to the original data. The original data may not be changed.

According to another embodiment, a system for performing data analysis using neural networks is disclosed. The system includes one or more processors; one or more memories coupled to the one or more processors; and program instructions stored in the one or more memories, the one or more processors being operable to execute the program instructions, the program instructions including: generating a data representation using a data set, the data set including a plurality of attributes, wherein generating the data representation includes: modifying the data set using a training algorithm, wherein the training algorithm includes growing the data set; and performing convergence testing, wherein convergence testing checks for convergence of the training algorithm, and wherein the modifying of the data set is repeated until convergence of the training algorithm occurs; and displaying one or more subsets of the data set using the data representation.

According to yet another embodiment, a computer program product for computer data analysis using neural networks is disclosed. The computer program product includes computer-readable program code for generating a data representation using a data set, the data set including a plurality of attributes, wherein generating the data representation includes: modifying the data set using a training algorithm, wherein the training algorithm includes growing the data set; and performing convergence testing, wherein convergence testing checks for convergence of the training algorithm, and wherein the modifying of the data set is repeated until convergence of the training algorithm occurs; and computer-readable program code for displaying one or more subsets of the data set using the data representation.

According to yet another embodiment, an apparatus for performing data analysis using neural networks is disclosed. The apparatus includes means for representing a data set, the data set including a plurality of attributes; means for generating the representation means using the data set, wherein generating the representation means includes: modifying the data set using a training algorithm, wherein the training algorithm includes growing the data set; and performing convergence testing, wherein convergence testing checks for convergence of the training algorithm, and wherein the modifying of the data set is repeated until convergence of the training algorithm occurs; and means for displaying one or more subsets of the data set using the modified data representation.

According to one embodiment of the invention, a method of computer data analysis using neural networks is disclosed. The method includes generating a data set $\overline{D}$, the data set including a plurality of attributes and a plurality of data set nodes; initializing the data set, initializing the data set including: calculating an autocorrelation matrix, $\aleph$ over the input data set $\overline{D}$, where $$\aleph = \frac{1}{card(\overline{D})} \sum_{\forall d \in \overline{D}} d \cdot d^T;$$

finding two longest eigenvectors of $\aleph$, $e_1$ and $e_2$, where $|e_1| > |e_2|$; and initializing vector values of each element of a data representation F by spanning it with element values of the eigenvectors; generating a data representation using a training algorithm, wherein the training algorithm includes growing the data set, growing the data set including: finding $K_q$ for each of the data set nodes, where $K_q$ is the node with the highest average quantization error, arg $$\max_q \{\overline{q}(t)_{K_q}\}$$

for each of the data set nodes, where $$\overline{q}(t)_{K_q} = \frac{1}{t-1} \sum_{t=1}^{t=t-1} q(t)_{K_q}$$

is the average quantization error for node q, where:

$$K_x = \underset{x}{\operatorname{argmax}} \{\|K_q - K_{<r(q)-1, c(q)>}\|, \|K_q - K_{<r(q)+1, c(q)>}\|\}$$

$$K_y = \underset{y}{\operatorname{argmax}} \{\|K_q - K_{<r(q), c(q)-1>}\|, \|K_q - K_{<r(q), c(q)+1>}\|\}$$

if $\|K_y - K_c\| < \|K_x - K_c\|$ then
   $n_r = r(y)$ if $r(y) < r(c)$, else $n_r = r(c)$; and
   $n_c = c(y)$;
else $n_r = r(y)$; $n_c = c(x)$ if $c(x) < c(c)$, else $n_c = c(c)$;

inserting a new row and column after row $n_r$ and column $n_c$; interpolate new attribute values for the newly inserted node vectors using:

$$K_{<r,n_c>} = (K_{<r, n_c-1>} + K_{<r, c_n+1>}) \frac{\alpha}{2} \text{ and } K_{<n_r, c>} = (K_{<n_r-1, c>} + K_{<n_r+1, c>}) \frac{\alpha}{2},$$

where $\alpha \in U(0,1)$; performing convergence testing, wherein convergence testing checks for convergence of the training algorithm, and wherein the training algorithm is repeated until convergence of the training algorithm occurs; and displaying one or more subsets of the data set using the data representation.

In one embodiment, performing convergence testing includes testing condition $q(t) < Q_e$. In another embodiment, the training algorithm further includes:
   $t = t+1$;
   $\forall d \in \overline{D}$;
   if (t<50 or afterGrow)

$$\wp_d = \underset{<r,c>, \forall r \in [1, F_R], \forall c \in [1, F_C]}{\operatorname{argmin}} \|d - F_{<r,c>}\|_\rho$$

afterGrow=false
else
   $\wp_d$=FindSCWS(d)
call function: FindNeighborhoodPatterns($\overline{\wp}$)
call function: BatchUpdateMatchVectors $$q(t) = \frac{1}{\operatorname{card}(\overline{D})} \sum_i (\|d - F_{\wp_d}\|\rho); \text{ and}$$

if (MayGrow(t) and $t < t_{max}$), call function: GrowKF.

In another embodiment, a plurality of display and/or analysis features may be included. A composite view may further include: constructing an attribute matrix; and selecting a highest value for each attribute value from the selected set of attributes. A range filter may be included to select regions on the data representation and filter out nodes based on defined value ranges. A zooming function may include: making a selection of nodes to form a base reference of interest; defining a set of data records from a second data set; matching the second data set to the data representation; flagging all records that are linked to the matched region; and generating a second data representation using the flagged records. Visual scaling may include changing the minimum and maximum values used to calculate a colour progression used to visualize at least one of the plurality of attributes, and re-interpolating the active colour ranges over the new valid range of attribute values. A labeling engine may include: linking attribute columns in an input file to attributes in the data representation; selecting attributes from the input file to be used for labelling; determining with which row and column each row in the input file is associated; and placing labels on the data representation. An advanced search function be included to: read a set of data records from a data source; match attribute columns from the set of data records to attributes in the data representation; and display a list of all records that are associated with nodes that are part of the active selection on the data representation.

It is to be understood that other aspects of the present invention will become readily apparent to those skilled in the art from the following detailed description where, simply by way of illustration, exemplary embodiments of the invention are shown and described. As will be realized, the invention is capable of other and different embodiments, and its several details are capable of modifications in various respects, all without departing from the invention. Accordingly, the drawings and description are to be regarded as illustrative in nature and not as restrictive.

BRIEF DESCRIPTION OF THE DRAWINGS

These and other features, aspects, and advantages of the present invention will become better understood with regard to the following description and accompanying drawings where:

FIG. 7 is an example range filter interface screen shot, in accordance with an embodiment of the present invention.

DETAILED DESCRIPTION

Figure 1:
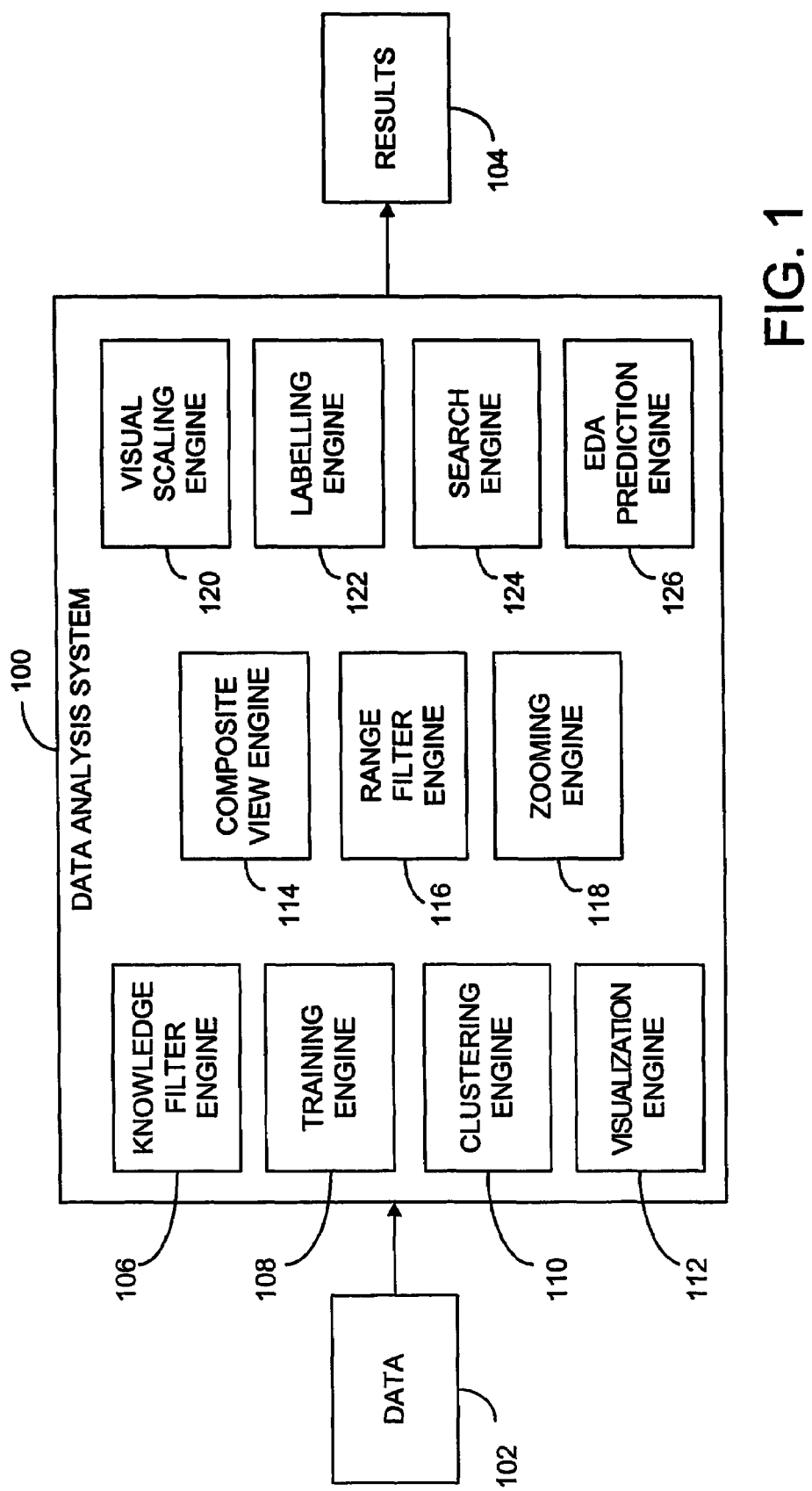
FIG. 1 is an environment diagram of a data analysis system, in accordance with an embodiment of the present invention.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

In the following description, reference is made to the accompanying drawings, which form a part hereof, and through which is shown by way of illustration specific embodiments in which the invention may be practiced. It is to be understood that other embodiments may be used as structural and other changes may be made without departing from the scope of the present invention.

In accordance with one embodiment, the present invention includes a data analysis system using a knowledge filter to visualize and analyze high-dimensional data. Throughout this specification, the term "knowledge filter" is used to identify an optimized representation of an input data set, where the optimized representation is constructed during a training process. The knowledge filter may also be referred to generally as the data representation. In one exemplary embodiment, the training process uses unsupervised neural networks. In another embodiment, the training process generates the representation of the input data considering similarity. In one embodiment, in general terms, the knowledge filter includes a number of coupled, or connected, hexagons called nodes. Considering relevant attributes, two nodes that are closer together are more similar than two nodes that are further apart. The knowledge filter can be viewed for any particular attribute in the data set using attribute window views. Using multiple attribute windows simultaneously, each viewing a different attribute, provides for investigative and analytical abilities. In one embodiment, the attribute window is a colour depiction of complex multi-dimensional data in two dimensions. As each attribute is displayed in its own window, the dynamics and interrelationships within the data may be identified. The attribute depictions can provide insight and explain why and how certain events, related to the input data set, occur. In another embodiment, the attribute window may use grayscale depiction, or other format depiction of data where differentiation between attributes can be made. While the included drawings and figures are grayscale images, colour implementations may be used.

In general terms, the underlying algorithms of data analysis system train and create a knowledge filter by allowing repetitive competition between nodes for the right to "represent" records from the data set. Winning nodes influence their neighbours, who less influence their neighbours, and so on. Guided by an innate desire to accurately represent the input data and code dictating the magnitude and direction of its growth, the neural network learns and matures to become an accurate representation of the input data, expressed in a smaller and digestible space and shape that can be embodied as the knowledge filter.

In accordance with one embodiment, the data analysis system is a data mining and analysis tool, based on the self-organizing feature-mapping neural network algorithm developed by T. Kohonen. In one embodiment, the system constructs a mapping of high dimensional data onto a two dimensional plane. The mapping is achieved through an iterative training process. The output of the training process is a trained map that can be used for analysis and data mining. One example training process is knows as the self-organizing map (SOM) algorithm.

The trained map can be used to deduce information embedded in the input data that may not have been readily apparent to the user when viewing the data in conventional formats. One desirable outcome of the trained map of the present invention is the ability to do prediction on any element of a data record, similar to the input space, that was not used for training. This is done by finding the most similar data record in the trained map, and interpolating attribute values over the found record, or over it and its neighbouring records.

The following terminology will be used throughout the specification: A data record/vector is a set of values describing attributes of a single occurrence within an input domain; "the system" or "the data analysis system" is the data analysis and data-mining tool; a map is a two-dimensional set of data records produced as an output of the SOM algorithm; and the SOM algorithm is an unsupervised neural network training algorithm.

The following concepts and symbols are used through the present specification:

Symbol Meaning

F A knowledge filter $F_{<r,c>}$ The data vector at row r, column c, in the knowledge filter F.

$F_{<r,c>,I}$ Element I of the data vector at row r, column c, in the knowledge filter F.

$F_R$ The number of rows in the knowledge filter F $F_C$ The number of columns in the knowledge filter F $r(F_{<r,c>})$ A function that extracts the value of r from $F_{<r,c>}$.

$c(F_{<r,c>})$ A function that extracts the value of C from $F_{<r,c>}$.

[a,b] A enumerable list of nominal values, including both a and b a A data vector of the form $[a_1, a_2, \ldots, a_n]$, where a contains n elements.

$\tau(a_i)$ The function $\tau$ returns a Boolean value indicating whether element i of vector a is missing or not.

$i_{min}$ The minimum value present in a data set for an attribute i.

$i_{max}$ The maximum value present in a data set for an attribute i.

card(d) A function returning the number of elements in vector d.

$\|a-b\|_\rho$ Calculates the Euclidean norm between two data vectors, a and b, for only those elements of a and b that are not missing. Thus, where the regular Euclidean norm $\|a-b\|$ is defined as $$\sqrt{\sum_i (a_i - b_i)^2}, \|\cdot\|_\rho$$

is defined only for elements $a_i$ and $b_i$ of a and b that are not missing, i.e.

$$\sqrt{\sum_{\forall i, \neg \tau(a_i) \wedge \neg \tau(b_i)} (a_i - b_i)^2}.$$

It is assumed that both a and b contains an equal number of elements. The symbol ^ represents a logical 'AND' statement, and the symbol ¬τ represents a logical negation of a statement. Thus, the statement ¬τ(a$_i$) indicates that element i of vector a must not be missing.

{•} Represents a list of vector values, such as {a,b,c}. Implicit to this definition is an addition operator ⊕, which appends an element to the list. Therefore, the statement {a,b}⊕c results in the list {a,b,c}. A list of vector values can also be represented by a barred capital bold letter, such as $\overline{A}$.

Referring now to FIG. 1, an environment diagram of the data analysis system, in accordance with an embodiment of the present invention, is shown. The data analysis system 100 receives data 102, which is the input data set, and provides results 104 to the end user based on a processing of the received data 102. In one embodiment, the data analysis system includes one or more engines for processing the data 102. A used in this specification, an engine is, for example, a computer program, application, process, function, or set of computer executable commands that performs a function for other programs. An engine can be a central or focal program in an operating system, subsystem, or application program that coordinates the overall operation of other programs and engines. An engine may also describe a special-purpose program that contains one or more algorithms or uses rules of logic to derive an output. The term "engine" is not limited to the above examples but is intended to inclusively describe computer-executable programs. In the illustrated embodiment, the data analysis system 100 includes a knowledge filter engine 106, a training engine 108, a clustering engine 110, a visualization engine 112, a composite view engine 114, a range filter engine 116, a zooming engine 118, a visual scaling engine 120, a labelling engine 122, a search engine 124, and an equal distance averaging (EDA) prediction engine 126. The composite view engine 114 may perform the composite viewing functions. The range filter engine 116 may perform the range filter functions. The zooming engine 118 may perform the zooming functions. The visual scaling engine 120 may perform the visual scaling functions. The labelling engine 122 may perform the labelling functions. The search engine 124 may perform the advanced search functions. The EDA prediction engine 126 may perform the EDA functions. The engines may be included in any desired combination. It is not necessary that all of the engines be used with the data analysis system 100. One or more engines may be combined or work in conjunction with one another. For example, the knowledge filter engine 106 may utilize functions of the training engine 108 to generate a knowledge filter. Each of the engines may also be combined to perform multiple processes or functions.

The data analysis system 100 may operate on any suitable general purpose computer, computer system, server, or other suitable device capable of running the described system and processes. The data analysis system may be coupled to one or more databases for the storing of the input data set, program instructions for the system and various engines, results, attribute window views, and other functions of the system.

In one exemplary embodiment, the input data set may be provided to the data analysis system in a predefined format. In one example embodiment, the data analysis system receives a matrix of data, where the first row of data contains two or more columns containing the names of the variables or attributes. The second and subsequent rows contain the data records with a value under each of the attribute names set out in the first row. Missing values are denoted by a blank or "?" entries, or any other indication of an empty entry. In one embodiment, the data analysis system processes numerical values. However, the data analysis system may also process other desired forms of data.

Input data may be in a text file, delimited by tabs or comma separated value (CSV) format. Many existing, conventional systems for storing or accessing data produce text files in a format that is suitable for the data analysis system. Accordingly, the data analysis system may be used with existing data and data systems. For example, the data analysis system may also receive data stored in Microsoft Excel format, Access format, ASCII, text, and any other suitable format.

In one embodiment, a sufficient sampling of data is used to generate results. For example, many statistical and regression techniques require only a sample of the true underlying "population," or complete set of possible results.

In one exemplary embodiment, the input data may contain between 100 and 5,000 records having between 5 and 50 attributes. In another embodiment, data having up to 20,000 records and up to 200 attributes may be processed. However, any number of records having any number of attributes may be processed by the data analysis system. The performance capabilities of the particular computer or system being used, such as, for example, processing speed, number of processors, amount of RAM and memory available to the system, may determine the quantity of data that may be analyzed at any given time.

The following description includes details regarding the training process, the mathematics, evaluation criterion, and heuristic optimisations of the data analysis system.

In one exemplary embodiment, the algorithm used by the system includes three steps: (1) sampling a training pattern, (2) matching it to the map, and (3) updating the map to more closely represent the input pattern.

One exemplary training algorithm is generally summarized as follows:

1. Initialization. Construct at grid of weight vectors. The initial weight vectors can be initialised randomly, or using an alternate initialisation scheme. It would however be useful to ensure that $\overline{w}_j(0)$ is different for j=1, 2, ..., N, where N is number of neurons in the grid.

2. Sampling. Draw a sample $\overline{x}$ from the input space. $\overline{x}$ represents an input signal (i.e. a data record).

3. Similarity Matching. Find the neuron in the grid that is the most like $\overline{x}$, using a minimum distance criterion, such as the Euclidean distance. The best matching neuron $i(\overline{x})$ at time n, $$i(\overline{x}) = arg_j \min \|\overline{x}(n) - \overline{w}_j\|, j=1, 2, \ldots, N \qquad (1)$$

4. Updating. Adjust the synaptic weight vectors of all neurons, using the update formula $$\overline{w}_j(n+1) = \begin{cases} \overline{w}_j(n) + \eta(n)\pi_{j,i(\overline{x})}(n)[\overline{x}(n) - \overline{w}_j(n)], & j \in \Lambda_{i(\overline{x})}(n) \\ \overline{w}_j(n), & \text{otherwise} \end{cases} \qquad (2)$$

where $\eta(n)$ is the learning-rate parameter, and $\Lambda_{i(\overline{x})}(n)$ is the neighbourhood function centred around the winning neuron $i(\overline{x})$, both $\eta(n)$ and $\Lambda_{i(\overline{x})}(n)$ vary dynamically for improved results.

5. Continuation. Repeat steps from 2 until no noticeable changes in the weight vectors are observed.

A choice for $\pi_{j,i}$ is the Gaussian type function $$\pi_{j,i} = \exp\left(-\frac{d_{j,i}^2}{2\sigma^2}\right) \quad (3)$$

where σ is the effective width of the Neighbourhood at a specific time. It may be calculated as $$\sigma(n) = \sigma_0 \exp\left(-\frac{n}{\tau_1}\right) \quad (4)$$

The learning rate may also be decayed over time using $$\eta(n) = \eta_0 \exp\left(-\frac{n}{\tau_2}\right) \quad (5)$$

One measure used to evaluate the representation of the input space in the trained map is the quantization error. Quantization error is defined as the average sum of distance from each training pattern and it corresponding best matching unit. The quantization error for a single training pattern $\bar{x}$ is defined as $$d(\bar{x}, \bar{w}_c) = \min_j \{d(\bar{x}, \bar{w}_j)\} \quad (6)$$

where $d(\bar{x}, \bar{w}_j)$ represents the Euclidean distance between $\bar{x}$ and $\bar{w}_j$, and j=1, 2, . . . N, c is the index of the best matching weight vector. The global quantization error then is $$\varepsilon_q = \frac{1}{P}\sum_{p=1}^{P} d(\bar{w}_p, \bar{w}_c) \quad (7)$$

where P is the number of training patterns.

A BatchMap algorithm is an optimisation algorithm that may be used in the data analysis system. The BatchMap algorithm may provide accelerated training of self-organizing maps.

One exemplary version of the BatchMap algorithm is given as:
1. For the initial reference vectors, take, for instance, the first K training samples, where K is the number of reference vectors.
2. For each map unit i, collect a list of copies of all those training samples x whose nearest reference vector belongs to the topological Neighbourhood set Ni of unit i.
3. Take for each new reference vector the mean over the respective list.
4. Repeat from 2 a few times.

Another exemplary batch algorithm is as follows:
1. Initialise the model vectors $m_i$ (Any suitable initialisation scheme can be used.)
2. For each unit, j, compute the average of the data vectors that the unit j is the best match for. Denote this average with $\bar{x}_j$.
3. Compute new values for the model vectors $m_i$ using the equation $$m_i = \frac{\sum_j n_j h_{ji} \bar{x}_j}{\sum_j n_j h_{ji}},$$

where j goes through all the model vectors. The term $h_{ji}$ is the neighbourhood function of the SOM and $n_j$ is the number of data vectors that the unit j is the best match for.
4. Repeat steps 2 and 3 until convergence criteria are satisfied.

An exemplary batch SOM algorithm is given as follows:
Initialise weight vectors
t=0
for epoch=1 to $N_{epoch}$ do
Interpolate new value for neighbourhood width, σ(t)
Initialise numerator and denominator in $$w_k = \frac{\sum_{t'=t_0}^{t'=t_f} h'_{ck}(t')x(t')}{\sum_{t'=t_0}^{t'=t_f} h'_{ck}(t')} \text{ to } 0$$

For record=1 to Nrecord do
  i. t=t+1
  ii. for k=1 to K do
    1. Find best matching unit
  iii. For k=1 to K do
    1. accumulate numerator and denominator in $$w_k = \frac{\sum_{t'=t_0}^{t'=t_f} h'_{ck}(t')x(t')}{\sum_{t'=t_0}^{t'=t_f} h'_{ck}(t')}$$

for k=1 to K do
  i. update weight vector $w_k$ using $$w_k = \frac{\sum_{t'=t_0}^{t'=t_f} h'_{ck}(t')x(t')}{\sum_{t'=t_0}^{t'=t_f} h'_{ck}(t')}$$

Figure 2:
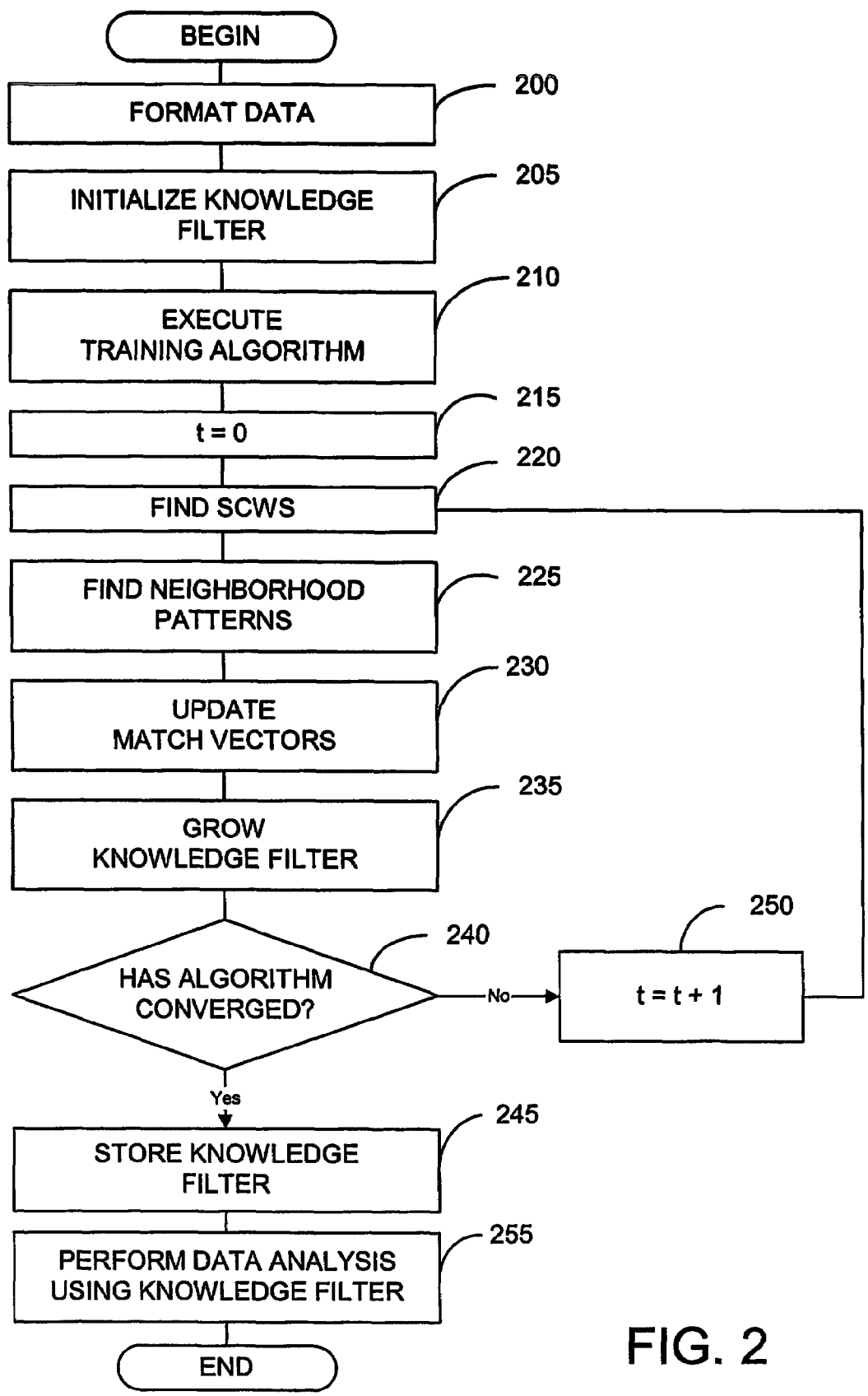
FIG. 2 is a flow diagram of a data analysis process, in accordance with an embodiment of the present invention.

FIG. 2 is a flow diagram of a data analysis process, in accordance with an embodiment of the present invention. The process illustrated in the flow diagram of FIG. 2 is one example of steps in the data analysis system. The process may operate with less than the illustrated steps, including additional step, in other orders of operation, or with other desired modifications and variations. Some of the listed steps include functions described in greater detail in other sections of the specification. In step 200, the data input by the user is formatted for input to the data analysis system. In step 205, the knowledge filter is initialized. In step 210, the training algorithm is executed. In step 215, a variable is set to zero (0), which is used to control the operation of the training algorithm. In step 220, the FindSCWS is called to determine the most similar matching node. In step 225, the FindNeighborhoodPatterns function is called to find all nodes that fall within the currently considered node's neighbourhood. In step 230, the BatchUpdateMatchVectors in called to update the feature vector. In step 235, the GrowKF function is called. Using GrowKF, the size of the knowledge filter is increased to allow it to better capture the input data space. In step 240, a check is performed to determine if the algorithm has converged. If the algorithm has converged, then the algorithm is stopped and the knowledge filter is stored in memory for analysis, step 245. In step 250, if the algorithm has not converged, the control variable t is incremented by one and steps 220 through 240 are repeated. In step 255, analysis may be performed using the stored knowledge filter. Analysis using the knowledge filter includes performing EDA predictions, composite attribute viewing, performing range filter analysis, visual scaling, individual labeling, advanced searching, zooming functions, and other desired data analysis functions.

In accordance with one embodiment, a more detailed description of the knowledge filter creation process is provided below.

Since data can be read from different data sources, data used for creating the knowledge filter is stored in memory in a generic container class that is independent from the source of data. The generic container class, referred to in the following sections as a training set, is a list of data vectors, $\overline{D}$, where $d_i$ is the ith vector in $\overline{D}$, and $d_{i,j}$ is the jth element of vector i.

The input data may be subject to a data preparation process. In an exemplary data preparation process, a data scaling process and a binarisation process is be performed on the training set. In an exemplary embodiment, before the training algorithm commences, the complete training set $\overline{D}$ may be pre-processed. Pre-processing may include a two-step process. Each data vector in the training set is scaled to the range [0,1], the first step, and then flagged attributes are binarised, the second step. In an exemplary data scaling process, each element in each data vector in the training set $\overline{D}$ is replaced by a scaled representation of itself. The scaling process thus entails:

$\forall i \in [1, card(d)], \forall d_i \in \overline{D}$ $d_{i,j} = (d_{i,j} - i_{min})/(i_{max} - i_{min})$ In an exemplary binarisation process, the system automates converting attributes, including non-numeric and non-scalar attributes, into one or more toggled attribute values. The binarisation process is discussed below in greater detail.

In one exemplary embodiment, the knowledge filter may have a predefined structure. In one embodiment, the knowledge filter F consists of a two-dimensional grid of positions, called nodes. Each node has an associated row and column position. A specific node position is references through the notation $F_{<r,c>}$, where $<r,c>$ indicates a specific row and column position. Each node is considered to be a hexagon, implying that it is adjacent to six other nodes. For a knowledge filter with $K_R$ rows and $K_C$ columns, nodes are arranged in the following fashion:

$F_{<1,1>}$    $F_{<1,2>}$    ...    $F_{<1,F_C>}$
$F_{<2,1>}$    $F_{<2,2>}$           $F_{<2,F_C>}$
...
$F_{<F_R,1>}$  $F_{<F_R,2>}$         $F_{<F_R,F_C>}$

In an exemplary knowledge filter initialisation process, node values are initialized through a variant of a technique called Principal Plane Initialization. The initialization algorithm Includes the following steps:

Calculate an autocorrelation matrix, $\aleph$ over the input data set $\overline{D}$, $$\text{where } \aleph = \frac{1}{card(\overline{D})} \sum_{\forall d \in \overline{D}} d \cdot d^T.$$

Note that $d \cdot d^T$ is a vector multiplication operator, and not the inner product.

Find the two longest eigenvectors of $\aleph$, $e_1$ and $e_2$, where $|e_1| > |e_2|$.

Initialize the vector values of each element of the knowledge filter F by spanning it with the element values of the eigenvectors. The following initialization rules are used:

1. $F_{<F_R,0>} := 0$

2. $F_{<F_R,F_C>} := e_1$

3. $F_{<1,F_C>} := e_1 + e_2$

4. $F_{<F_R,F_C>} := e_2$

5. $\forall c \in [2, F_C - 1], F_{<1,c>} := \frac{F_C}{F_C - c} F_{<1,F_C>} + \frac{F_C - c}{F_C} F_{<1,1>}$ 6. $\forall c \in [2, F_C - 1], F_{<R_C,c>} := \frac{c}{F_C} F_{<F_R,F_C>} + \frac{F_C - c}{F_C} F_{<F_R,1>}$ 7. $\forall r \in [2, F_R - 1], F_{<r,1>} := \frac{c}{F_R} F_{<F_R,1>} + \frac{F_R - r}{F_R} F_{<1,1>}$ 8. $\forall r \in [2, F_R - 1], F_{<r,F_C>} := \frac{r}{F_R} F_{<F_R,F_C>} + \frac{F_R - r}{F_R} F_{<r,F_R>}$ 9. $\forall r \in [2, F_R - 1], \forall c \in [2, F_C - 1],$ $$F_{<r,c>} := \frac{c}{F_C} F_{<r,F_C>} + \frac{F_C - c}{F_C} F_{<r,1>}$$

A more detailed knowledge filter training algorithm, in accordance with an embodiment of the invention, is described as follows.

The following constants may be user definable:

$t_{max}$: The maximum number of training iterations.

$Q_e$: A minimum quantization error threshold.

In addition to the above, the following symbols relevant to the training process are defined:

t: The current training step.

q(t): The current quantization error afterGrow: Boolean value (initially set to false) indicating whether the algorithm perform a map growing in the previous iteration.

For each training pattern d in $\overline{D}$, define a construct retaining the position of the row and column position of the data vector in the knowledge filter that most closely represents the vector d. For training pattern d, $\wp_d$ represents this position.

Convergence testing ascertains whether training should stop. This is done by testing whether the conditions $q(t) < Q_e$ and $t < t_{max}$ hold.

An exemplary training algorithm is as follows:

1. Initialize knowledge filter F from the data set $\overline{D}$.

2. t=0.

3. Perform the following steps, while the algorithm has not converged:

a. t=t+1
b. ∀d∈D̄
   i. if (t<50 or afterGrow)

$$1.\ \wp_d = \underset{<r,c>, \forall r \in [1,F_R], \forall c \in [1,F_C]}{\operatorname{argmin}} \|d - F_{<r,c>}\|_\rho$$

2. afterGrow=false
  ii. else
    1. $\wp_d$=FindSCWS(d)
  iii. FindNeighborhoodPatterns($\bar{\wp}$)
  iv. BatchUpdateMatchVectors $$v.\ q(t) = \frac{1}{card(\bar{D})} \sum_i \left(\|d - F_{\wp_d}\|_\rho\right).$$

vi. if (MayGrow(t) and t<t$_{max}$)
    1. GrowKF.

The above algorithm contains the following functions:

FindSCWS(d): Determines the most similar matching node in F to d using a technique that is computationally less expensive than iterating over all the nodes in F. The technique works as follows:

For d, determine $\wp_d(t-1)$
Build a list, $\bar{N}_d$, of all the nodes neighbouring $F_{\wp_d}$.
If $\|d-F_{\wp_d}\|_\rho < \|d-\bar{N}_{d,i}\|_\rho, \forall i \in \bar{N}_d$, return the answer $\wp_d$, else set $$\wp_d = \underset{i}{\operatorname{argmin}} \|d - \bar{N}_{d,i}\|_\rho$$

and repeat from step 2.

FindNeighborhoodPatterns($\bar{\wp}$): finds, for each node in the knowledge filter, all the nodes that fall within its neighbourhood, using a currently defined neighbourhood width. Neighbourhood width is simple, linear function dependant on the current step and the maximum number of steps. Thus the neighbourhood width, at any time step t, is defined as η(t)= (1−(t+t$_{max}$)). We also define w$_m$=(F$_R$+F$_C$)/2 Each knowledge filter node also has a list of matched positions, $K_{<r,c>\bar{M}}$ associated with it.

The FindNeighborhoodPatterns($\bar{\wp}$) function then has the following effect:

Calculate η(t).
1. w=⌈η(t)w$_m$⌉
2. ∀d∈D̄:
  a. p$_l$=max {c($\wp_d$)−w,0}
  b. p$_r$=min {c($\wp_d$)+w,F$_C$}
  c. p$_t$=max {r($\wp_d$)−w,0}
  d. p$_b$=max {r($\wp_d$)+w,F$_R$}
  e. ∀r∈[p$_t$, p$_b$], ∀c∈[p$_l$, p$_r$]
  f. $\epsilon = \sqrt{(K_R-r(\wp_d))^2 + (K_C-c(\wp_d))^2}$
  g. If (δ≦w)
    i. Add d to $K_{<r,c>\bar{M}}$ GrowKF: Growing the knowledge filter increases its size to allow it to better capture the input data space. The algorithm, when a growing step is triggered, functions as follows:

1. Find K$_q$, the knowledge filter node with the highest average quantization error, i.e. arg $$\max_q \{\bar{q}(t)_{K_q}\},$$

for all knowledge filter nodes, where $$\bar{q}(t)_{K_q} = \frac{1}{t-1} \sum_{t=1}^{t=t-1} q(t)_{K_q}$$

is the average quantization error for node q over the previous training steps.

2. $K_x = \underset{x}{\operatorname{argmax}} \{\|K_q - K_{<r(q)-1,c(q)>}\|, \|K_q - K_{<r(q)+1,c(q)>}\|\}$ 3. $K_y = \underset{y}{\operatorname{argmax}} \{\|K_q - K_{<r(q),c(q)-1>}\|, \|K_q - K_{<r(q),c(q)+1>}\|\}$ 4. if $\|K_y-K_c\| < \|K_x-K_c\|$ then
  a. n$_r$=r(y) if r(y)<r(c), else n$_r$=r(c)
  b. n$_c$=c(y)
5. else
  a. n$_r$=r(y)
  b. n$_c$=c(x) if c(x)<c(c) else n$_c$=c(c)
6. Insert a new row and column after row n$_r$ and column n$_c$.
7. Interpolate new attribute values for the newly inserted node vectors using the formulae:

$$K_{<r,n_c>} = (K_{<r,n_c-1>} + K_{<r,c_n+1>})\frac{\alpha}{2} \text{ and } K_{<n_r,c>} = (K_{<n_r-1,c>} + K_{<n_r+1,c>})\frac{\alpha}{2},$$

where α∈U(0,1)

BatchUpdateMatchVectors: updates the feature vector associated with each knowledge filter position, based on all the data vectors that were matched to it from D̄.

The algorithm functions as follows:
1. v=0.05
2. ∀r∈[1,F$_R$], ∀c∈[1,F$_C$]
  a. f$_c$=0
  b. g=0
  c. ∀d∈$K_{<r,c>\bar{M}}$
    i. f$_c$=f$_c$+1
    ii. g=g+d
    iii. h=$K_{<r,c>}$(t−2)−$K_{<r,c>}$(t−1)
    iv. $K_{<r,c>}$>=g+vh The following Shortcut Winner Search (SCWS) may accelerate the training process in that it decreases the computational complexity of searching for a best matching unit (BMU) associated with a particular training pattern. After a number of training epochs, the map tends to become organized, i.e. the sum of corrections made to the weight vector of a particular neuron in the map is small. This dictates that the BMU associated with a training pattern may be in the vicinity of the BMU of the pattern, at a previous epoch. SCWS therefore tracks the position of the BMU associated with each training pattern after each epoch. This is then used to calculate the new BMU, starting the search at the position of the BMU at the previous epoch.

Each unit not on the perimeter of the map is surrounded by six units. SCWS evaluates the node indicated by the saved BMU, and all surrounding neurons. If the saved BMU is still the BMU, no further evaluation is done. If one of the six direct neighbour units is found to be a better match, the search is repeated with the new best match as the centre node, and it's six direct neighbours are evaluated.

The SCWS algorithm can be summarised as follows:
1. Retrieve the BMU position calculated at a previous epoch
2. Recalculate distance to the BMU
3. Calculate the distance to all direct neighbours
    a. If the BMU found at a previous epoch is still the closest match to the training pattern, stop the search
    b. Determine the closest perimeter unit, and make it the BMU.
    c. Repeat from step 3.

In one exemplary embodiment, map initialisation is performed by an algorithm referred to as the SLC initialisation technique. In one embodiment, the SLC initialisation technique attempts to find a large enough hyper cube to cover all of the training patterns. To this extent, the algorithm finds the four extreme training patterns. This is done by first finding two training patterns with the largest inter pattern Euclidean distance. A third pattern is then found at the furthest point from these patterns, and the a fourth pattern is found, at the furthest distance from the three pattern already identified. These patterns are used to initialise the map neurons on the four corners of the map. All remaining neurons are then initialised by interpolating weight values for each attribute according to the values at the four corners of the map. Another example initialisation technique is random initialisation.

An example map initialisation technique is given as follows:

Assume an N×N map, and $w_{x,y}$ designates the neuron at row x and column y, and $\overline{w}_{x,y}$ designates the weight vector of the same neuron;
1. First select a pair of input patterns from the training set whose inter-pattern distance is largest among all the patterns in the training set. The vector values are used to initialise the weights of the neurons on the lower left and upper right corners of the map respectively. (i.e. $w_{N,1}$ and $w_{1,N}$). From the remaining patterns, the vector values of the training pattern the furthest from the two patterns already selected, is used to initialise the neuron on the upper left corner. (i.e. $w_{1,1}$). The neuron on the lower right corner of the map is set to the coordinates of the pattern that is the farthest from the previously selected three patterns.
2. Weights of neurons on the four edges of the map, can be initialised using the four following equations:

$$\overline{w}_{i,j} = \frac{\overline{w}_{1,N} - \overline{w}_{1,1}}{N-1}(j-1) + \overline{w}_{1,1} \text{ for } j = 2, \ldots, N-1 \quad (3)$$

$$\overline{w}_{N,j} = \frac{\overline{w}_{N,N} - \overline{w}_{N,1}}{N-1}(j-1) + \overline{w}_{N,1} \text{ for } j = 2, \ldots, N-1 \quad (3)$$

$$\overline{w}_{i,1} = \frac{\overline{w}_{N,1} - \overline{w}_{1,1}}{N-1}(i-1) + \overline{w}_{1,1} \text{ for } i = 2, \ldots, N-1 \quad (3)$$

$$\overline{w}_{i,N} = \frac{\overline{w}_{N,N} - \overline{w}_{1,N}}{N-1}(i-1) + \overline{w}_{1,N} \text{ for } i = 2, \ldots, N-1 \quad (3)$$

Since two points form a line in the input space, the line is uniformly partitioned into N−1 segments, and the ending points of the segments are used to initialise the weights of the neurons.

3. The remaining neurons are initialised using a top to bottom, left to right parsing scheme. This is explained using the following pseudo code:
    For i from 2 to N−1
        For j from 2 to N−1

$$\overline{w}_{i,j} = \frac{\overline{w}_{i,N} - \overline{w}_{i,1}}{N-1}(j-1) + \overline{w}_{i,1} = \frac{j-1}{N-1}\overline{w}_{i,N} + \frac{N-j}{N-1}\overline{w}_{i,1}$$

A Principal Plane initialisation process may be included. An additional description of an exemplary principal plane initialisation process is described. The Principal Plane initialisation process requires O(n) data set passes, and at that, only a single pass is needed. An exemplary algorithm is as follows:
1. Calculate the autocorrelation matrix (inverse covariance matrix) of the input data:

$$C_{xx} = \frac{1}{N}\sum_{t \in s} x(t)x^T(t).$$

S is the data set. $C_{xx}$ is a square matrix with dimensions equal to the dimensionality of S.
2. Find the two largest(longest) eigenvectors.
3. Initialize the initial neuron space by spanning it with the attribute values of the two eigenvectors.

An additional description of the Map Growing process is as follows:
1. Initialise a small network
2. Grow until optimal map size
    a. Train for λ pattern presentations
    b. Find the map unit, wc, with the largest average quantization error
    c. Find the furthest neighbour, wx in the x-dimension, and wy in the y-dimension
    d. Wn=0.5(wx+wc)α or Wn=0.5(wy+wc)α, where α∈[0, 1], and so for all units in the row & column
    e. Stop growing when
        i. Max map size is reached (#neurons<=#training patterns, or #neurons=β×#patterns, where β∈[0,1]
        ii. Max quantization error for a neuron is less than a threshold.
        iii. Global map convergence has been reached.
3. Refine map through normal training.

During each epoch, the current Neighbourhood width is calculated using the following linear formula:

```
At epoch e:
    MaxWidth = (#rows + #columns) / 2;
    If (e < epoch_threshold)
        New_width = (1 − (e / epoch_threshold)) * MaxWidth * 0.8
    Else
        New_width = 0,
``` where New_width represents the new neighbourhood width for epoch e, and epoch_threshold is a factor that is specified by the user. Its effect is in principle to limit the size of the Neighbourhood after at certain number of epochs have transpired. It is also used to instil a linear decrease in Neighbourhood size.

The 'Gaus'-factor mentioned above, is calculated as follows:

Information Needed:
Current neighbourhood width at epoch e
The BMUp
Coordinates of the map unit currently considered.

The Gaus factor is then calculated as:

exp(−(distance between *BMUp* and map unit)2/(2×
(Current Neighbourhood width)2)).

This factor is equal to the normal gaussian distribution function.

The following concepts are used in the following pseudo code training algorithm:
1. MatchLists: Associated with each neuron is a Boolean vector, called a MatchList. The MatchList dimension is equal to the number of patterns in DC. When a training pattern is found to be within the Neighbourhood of a particular unit, its corresponding entry in the unit's MatchList is toggled. This is a fast and simple way to track patterns in the topological neighborhood.
2. Randomization of data set: Randomisation produces a list of vector indexes in a random order. For each pattern, a set of two random indexes is calculated and these vector indexes are swapped:

```
srand((unsigned) time(&t));
for (int p=0;p < patCount ; p++)
{
    pat_idx1 = rand( ) % patCount;
    pat_idx2 = rand( ) % patCount;
    tmp = (*RandomPatterns)[pat_idx1];
    RandomPatterns->insert(pat_idx1, (*RandomPatterns)[pat_idx2]);
    RandomPatterns->insert(pat_idx2, tmp);
}
```

Note that BatchMap calculates a new weight vector as a mean value of all training patterns that were found to lie within in the topological neighbourhood of the map unit. It does therefore not matter in which order patterns are presented to the training algorithm. The above randomisation algorithm need therefore not be used.
3. Factors and flags
   WEIGHTCHANGES: Constant, representing a number of epochs. After every number of epochs, as specified in WEIGHTCHANGES, the map is grown, if possible.
   AfterGrow: A flag value, indicating whether the map was grown during a the previous epoch.
   The training pseudo code algorithm is as follows:

For Each epoch e,
  1. Clear all MatchLists
  2. For each pattern p in DC
  Determine the previous BMUp
  If (e<50) or AfterGrow
     Calculate BMUp using exhaustive searching over the complete map
     Toggle AfterGrow
  Else
     Calculate BMUp using Shortcut Winner Search
  Update BMUp
  3. For each map unit
  Determine all patterns in its topological neighborhood
  Calculate a new weight vector as the mean over all the training patterns in its MatchList
  4. Calculate the quantization error eq over all p in DC.
  5. If (e % WEIGHTCHANGES)==0
  Grow the neuron map
  Toggle AfterGrow The following exemplary software classes may be used:

| | |
|---|---|
| BMUXY: | Represents the row and column position of the Best Matching Unit associated with a training pattern. |
| Bvector: | Vector of Boolean values |
| Data: | Base class used to wrap a data set. Do not use directly. Derive a class from this base class. (Note: This base class is not abstract) |
| DataReader: | Wrapper class to read data that was written in a binary format to disk by the DataWriter class. There is no relationship between this class and the Data class and its derivates. The DataReader wraps reading primitive types from disk, as well as complex types such as vectors and matrices. |
| DataWriter: | Wrapper class to serialize information in a binary format. There is no relationship between the DataWriter class and the Data class and its derivatives. DataWriter wraps writing primitive types and complex types such as vectors and matrices. |
| Dmatrix: | A class representing matrix values of type double. |
| DVector: | Vector of double values. |
| Imatrix: | A class representing matrix values of type int. |
| IndicatorStats: | A struct containing values calculating during each clustering step |
| IVector: | Vector of int values |
| LabelData: | List of labels that may be shown on a map. The actual data vector of each map position is kept, as well as a string that is displayed. |
| LabelListEntry: | Wrapper class containing a label's relative position on a map, the label caption, and a VCL Tlabel instance. |
| MapContainer: | Wraps a trained SOM map that was written to a .smb file. It contains the map vectors, as well as statistics generated about the map, such as the u-matrIx, quantization error information, frequency information, component map colour indexes, cluster information, and all colouring information. |
| NeuronMap: | Wrapper class for a grid of SOMNeuron Instances. Contains methods to update neurons as well as grow the map. |
| PatternList: | Used by the UnsupervisedData class to maintain a list of the current set of training patterns managed by the class. |
| PosEntry: | Represents a single position in the neuron map. Used by the SCWS algorithm in the NeuronMap |
| PosList: | Linked list of position in a neuron map. |
| RecallData: | Wraps data read from a file, that is to be used for recall, or the predict function. |
| SmartMatrix: | A matrix of double values, with the added capability to perform functionality related specifically to clustering. |
| SOM: | Wrapper class for a Self-Organizing map. Maintains a NeuronMap, as well as members that take care of all the training issues. |
| SOMNeuron: | A single neuron in a SOM. Maintains a weight vector, as a well as links to all matching pattern in the training set. |
| TcurrPos: | Manages a position in a neuronmap. |
| TfrmClusInd: | Form. Displays the calculated cluster indicators, and allows the user to change the number of cluster that is to be displayed. Also allows the user to switch between flat and shaded clusters. |
| TfrmCompCol: | Shows a single representation of the SOM, such as Clusters, quantization error, frequency, U-Matrix or component values. Handles the selection of position of the map, and triggers updates to all other TfrmCompCol instances that are visible. Handles the selection of value range on the component map colour bar. |
| TfrmComponents: | Shows a summary of a data set before training commences. Allows the user to change basic training parameters that will influence the map training process. Also allows the user to cancel the training process. Spawns a training thread, and shows the training progress in a graph format. |
| TfrmDatViewer: | Shows a grid container data patterns that were read from a data file, on which recall, or the predict function, is to be done. |

-continued

| The following exemplary software classes may be used: | |
|---|---|
| TfrmGetLabel: | Allows a user to enter information about a label that is to be displayed on a SOM map. The user can also change the font information. |
| TfrmMain: | Main application form. This form is a MDIcontainer/MDIParent form. All other forms are children of this form. Handles, other than the default windows processing, updates/changes in the displayed information. |
| TfrmMDIChildrenList: | Shows a list of all the windows that are currently displayed. The user can then elect to close some of these windows. |
| TfrmPathSettings: | Allows the user to change settings that will enable/disable neurons available for selection when drawing a path. |
| TfrmPredict: | Aids the recall, or prediction, process. Allows specification of input and output files, and viewer data that are to be recalled. |
| TprefSettings: | Allows the user to change preferences |
| TfrmSelectComponents: | Displays a list of component windows that may be selected, and indicates to the user which windows are currently shown. The user can then decide what to display, and what not. |
| TfrmSMF: | Uses a tree view to display the structure of the information that may be represented by the SOM. This information includes the U-Matrix, Clusters, all the possible components, frequency and quantization error information. Also allows the user, additional to double clicking on an entry in the tree view to select to show individual components, or to show all the components in the map. |
| TfrmSplash: | Splash screen & about box. |
| TfrmStats: | Shows statistics on the map. Statistics may be shown for the complete map, a selection, a neighbourhood, a cluster or a single node. |
| TfrmWhat2Save: | When saving a bitmap of a displayed map to file, the user can choose to save the map as it is shown (with labels, selection, etc) or only save the basic map. |
| TimageInfoContainer: | Works with the TfrmCompCol class. Wraps a bitmap that is displayed by the TfrmCompCol, and maintains map information that can be used by processing methods of a TfrmCompCol instance. |
| TimeSeriesData: | Inherits its basic traits from the RecallData class. Wraps functionality to manage a list of sequential positions on the SOM, and manages tracking the current position in the list. |
| Tindicators: | Wraps a list of TindicatorStats structs. Introduces methods to calculate the indicators. |
| TprogressWindow: | Generic window that Is used in several places to show the progress of a specific task. |
| TSOMTrainingThread: | Works with an instance of the SOM class. Handles the complete training of a SOM. This is done in a separate thread, outside of the main application message processing loop, to avoid having to perform const hardcoded GUI updates in the Borland API. |
| UnsupervisedData: | Wraps all the data in the training set of a SOM. Inherits basic traits from the Data class. |
| VecNode: | Represents a single cluster in the SOM. Used while calculating clusters |
| VectorList: | Linked list managing a list of VecNode instances. |

In one embodiment of the invention, clustering may be used. Clustering within the context of the data analysis system may serve two purposes: (1) cluster membership of map units may be used when prediction is done. When predicting attribute values using a neighbourhood, only map units within the same cluster as the best matching unit are utilized to calculate a weighted mean. Cluster membership implies similarity, and without correct cluster information, prediction may be inaccurate; and (2) a graphical map showing clusters may be constructed. Aside from measures that may be calculated to find the best clustering, clusters shown should confirm knowledge about the data, such as is the case in classification problems.

The following section describes theoretical and implementation details for the classical Ward clustering algorithm, and a SOM-Ward algorithm, utilizing map specific topological information to construct clusters.

Ward clustering follows a bottom-up approach. The algorithm places each data unit considered for clustering, in its own cluster. An iteration of the algorithm identifies two clusters, which are then merged. This process is repeated until the desired number of clusters has been constructed. Identification of clusters for merging is done using the Ward distance, discussed below.

Ward clustering is characterized by the following variance criterion: The algorithm has as its goal to produce clusters with small variance over its members, and large variance between clusters. Therefore, at each iteration, clusters are merged that will contribute the least to the global variance criterion, which increases at each step.

The distance measure is called the Ward distance, and is defined as:

$$d_{rs} := \frac{n_r \cdot n_s}{n_r + n_s} \cdot \|\bar{x}_r - \bar{x}_s\|^2 \qquad (8)$$

Two clusters are denoted by r and s, $n_r$ and $n_s$ denote the number of data points in the clusters, and $\bar{x}_r$ and $\bar{x}_s$ denote the mean over the cluster member vectors.

The number of data points and the mean vector of the cluster are updated as:

$$\bar{x}_r^{(new)} := \frac{1}{n_r + n_s} \cdot (n_r \cdot \bar{x}_r + n_s \cdot \bar{x}_s), \qquad (9)$$

$$n_r^{(new)} := n_r + n_s \qquad (10)$$

This update is analogous to recalculating the centre of gravity of a set of point masses. Here, the coordinate vectors of a point mass in an arbitrary space is represented by $\bar{x}$ and its point mass by n.

One example Ward clustering approach is as follows:

Repeat until the desired number of clusters have been reached a. Find 2 clusters with minimal Ward distance, as characterized by equation (8)
b. Update the new cluster, using equations (9) and (10)
c. Update the number of clusters SOM-Ward clustering is similar to Ward clustering but adds a heuristic to ensure that all nodes belonging to a cluster is topologically related. (i.e. they lie next to each on the map) This can be achieved by biased the calculating of the Ward distance between nodes, and accordingly between clusters. Equation (8), describing the Ward distance between clusters r and s, can be redefined as:

$$d'_{rs} = \begin{cases} \infty, & \text{if } r \text{ and } s \text{ are not adjacent.} \\ d_{rs} & \text{Otherwise} \end{cases} \qquad (11)$$

As the above algorithm always searches for two clusters with minimal Ward distance, it follows that any two clusters with an inter-cluster distance of $\infty$ will not be considered to be merged into one cluster. The result of equation (11) can be regarded as the SOM-Ward distance. Further references in this section to the Ward distance may be regarded to be the same as references to the SOM-Ward distance.

Several issues come into play when considering the implementation of the above clustering algorithms. One consideration, aside from producing good clusters, is to optimise the clustering process, as it can be computationally expensive.

Ward clustering does not consider topological locality of map unit when calculating clusters. Map units are therefore solely merged based on their representative attribute values. Each map unit is initially regarded as a cluster.

In order to find two clusters with minimal Ward distance, the inter cluster distance for all clusters have to be calculated, and then searched for the minimum. One way to do this is to construct a distance matrix of all the inter cluster distances over all clusters. The distance matrix is constructed such that row and column indexes are significant. Such a matrix may be upper or lower triangular. This detail does not matter, as long as the same convention is used throughout the implementation. Equation 4 shows a 4×4 lower triangular matrix:

$$\begin{pmatrix} - & - & - & - \\ a_{21} & - & - & - \\ a_{31} & a_{32} & - & - \\ a_{41} & a_{42} & a_{43} & - \end{pmatrix} \quad (12)$$

Here, a21 indicates the distance between cluster 2 and cluster 1. The diagonal of the matrix contains all zeroes to indicate that they represent a distance that is not of interest. Values on the diagonal are never considered, and are therefore insignificant. This is not be confused with discussions regarding optimisation, where a distance of zero will become significant.

Map sizes are often very large, and sizes of 20×20 units are common. Following from the above discussion, such a map would require a distance matrix with dimensions of 400×400. Although memory wise, not really expensive, computationally however, it would take considerable time to process. Also note that as soon as this matrix has been calculated and the minimum inter cluster distance has been found, the matrix needs to be recalculated.

It is possible to avoid calculating a matrix, and parse the list of clusters linearly, searching for the minimum distance. As in the above matrix calculations, large numbers of calculations that have already been made would be repeated. This can be avoided if one considers that the only distances that will change in the distance matrix would be those relating to the clusters that were merged. As an example, consider a matrix as was shown in equation (12). This matrix represents inter cluster distances for 4 clusters. If the distance matrix was to be processed, and a32 found to contain the smallest entry, it would indicate that clusters 3 and 2 would be merged. If these two clusters are merged, the initial total number of clusters would decrease from 4, to 3. This change needs to be reflected in the distance matrix, and can be achieved by, for 4 clusters, clusters 2 and 3 to be merged:

Deleting row and column 3; and
Recalculating all distances in row and column 2.

This will result in a new matrix:

$$\begin{pmatrix} 0 & - & - \\ a_{21} & 0 & - \\ a_{31} & a_{32} & 0 \end{pmatrix} \quad (13)$$

The above can be formalized as the following heuristic for updating and maintaining a distance matrix in consistent format:

If a new cluster is to be constructed from clusters a and b:
  the new cluster index would be whichever is the smallest of a and b;
  all remaining cluster indexes higher than the largest of a and b, is decreased by a single step;
  complete row and column at position b, respectively, are removed; and
  complete row and column at position a, is updated to reflect recalculated distance to the new cluster.

This realises the cluster-indexing scheme, where the index range changes from 1 . . . k to 1 . . . (k−1).

Calculation of the Ward distance may be adapted using the following equation:

$$d_{rs} := \begin{cases} 0 & \text{if } n_r = 0 \\ & \text{or} \\ & n_s = 0, \\ \frac{n_r \cdot n_s}{n_r + n_s} \cdot \|\bar{x}_r - \bar{x}_s\|^2 & \text{otherwise.} \end{cases} \quad (14)$$

Note that r and s represent two clusters, and nr and ns represent the number of input data patterns that map to clusters r and s respectively. This adaptation is necessary to cater for the situation where there are no input data patterns mapping to a particular cluster. In large maps, (and even is very small maps, depending on the data set) this situation is common. If this adaptation were not taken into account, the Ward distance would not be calculable.

By calculating the Ward distance using the above method, several entries in the distance matrix will be zero. Merging of these "empty" clusters will continue until no empty clusters exist. Note that if a single "empty" cluster exists, there will be several zero entries in the distance matrix. As a heuristic solution to the problem of deciding which clusters to merge, clusters that are the closest, using the Euclidean norm, is merged.

The data analysis system calculates, for each of the last 50 clusters found when doing clustering, an indicator that serves as an evaluation of the clustering. This can be regarded as a "goodness" measure of a set of clusters. Indicators are calculated using the minimum Ward distance for each clustering. A ratio is calculated between a set of two clusterings. (e.g. between the minimum Ward distance for 20 and 19 clusters) The ratio is then normalized using a process discussed below.

For each c clusters:
  the symbol c represents the current number of clusters; and
  the function d(c) represents the minimal Ward distance for merging c into c−1 clusters.

The exact formulas to calculate the indicator I(c) for c clusters are:

$$I(c) := \max(0, I'(c)) \cdot 100 \quad (15)$$

where $$I'(c) := \frac{\mu(c)}{\mu(c+1)} - 1 \quad (16)$$

μ(c) is defined as:

$$\mu(c) := d(c) \cdot c^{\beta} \quad (17)$$

$-\beta$ is the linear regression coefficient for the point $[\gamma, \delta]$, and $$-\beta := \frac{s_{\gamma\delta} - \overline{\gamma\delta}}{s_{\gamma\gamma} - \overline{\gamma}^2} \quad (18)$$

$\gamma := \ln(c)$ and $\delta := \ln(d(c))$. $s_{\gamma\delta}$ is the correlation coefficient between $\gamma$ and $\delta$. The correlation coefficent is defined as $$r = \frac{\sum_{i=1}^{n}(x_i - \overline{x})(y_i - \overline{y})}{\delta_x \delta_y} \quad (19)$$

where x and y represent two correlated data points. Equation (19) can be simplified for calculation. The simplified version, using symbols from our regression, is:

$$s_{\gamma\delta} = \frac{\sum_{i=1}^{n}\gamma_i\delta_i - \frac{1}{n}\sum_{i=1}^{n}\gamma_i\sum_{i=1}^{n}\delta_i}{\sqrt{\sum_{i=1}^{n}\gamma_i^2 - \frac{1}{n}\left(\sum_{i=1}^{n}\gamma_i\right)^2}\sqrt{\sum_{i=1}^{n}\delta_i^2 - \frac{1}{n}\left(\sum_{i=1}^{n}\delta_i\right)^2}} \quad (20)$$

In accordance with one exemplary embodiment, cluster shading may be used. Cluster shading is a technique that shades the colour of individual nodes in a cluster according to the distance of those nodes from the gravity centre of the cluster. In order to do the colour adaptation, the centre of gravity of each cluster has to be calculated. The centre of gravity for cluster k, where cluster k consists of $n_k$ neurons, can be written as:

$$\overline{x}_{k_{COG}} = \frac{1}{\sum_{i=1}^{n_k} n_{k_i}}(n_{k_i} . \overline{x}_{k_i}) \quad (21)$$

where $n_{k_i}$ is the number of data patterns that have node $\overline{x}_{k_i}$ as their best matching unit. The furthest point from $\overline{x}_{k_{coo}}$ in the feature vector space of the cluster need also be identified, to be able to scale relative distances from $\overline{x}_{k_{coo}}$ to all the neurons in the cluster. This furthest point in cluster k is designated by $\overline{x}_{max}$. The Euclidean distance between $\overline{x}_{max}$ and $\overline{x}_{k_{coo}}$ is calculated, $k_{fact} = \|\overline{x}_{max} - \overline{x}_{k_{coo}}\|$. $k_{fact}$ is then used to determine a scaling factor for each neuron in the cluster, that is then used to calculate the intensity of the associated neuron colour. This associated colour is calculated as follows:

For each cluster:
1. Determine the current cluster colour from a predetermined collection of predefined colours, $\zeta_k$.
2. For each neuron in the current cluster:
    a. For each neuron n, with a feature vector $\overline{x}_n$, a distance factor $n_{fact}$ is calculated as $n_{fact} = \|\overline{x}_n - \overline{x}_{k_{coo}}\|$.
    b. A scaling factor, sn, is calculated as $s_n = n_{fact}/f_{fact}$
    c. $s_n$ is adapted with a factor to enlarge the intensity adaptation that will following, as $s'_n = s_n . \alpha$, where $\alpha$ is a constant.
    d. A copy is made of the cluster colour, $\zeta_n = \zeta_k$.
    e. $\zeta_n$ is decomposed into the three base colours, red, green and blue, individually designated by $\zeta_n^R, \zeta_n^G$ and $\zeta_n^B$.
    f. Each of the individual colour is then adapted using the scaling factor, $s'_n$, to be $\zeta_n^{R'} = \zeta_n^R - s'_n, \zeta_n^{G'} = \zeta_n^G - s'_n$ and $\zeta_n^{B'} = \zeta_n^B - s'_n$. By decreasing the individual base colours, a gradual decrease in colour intensity can be achieved.
    g. The individual colours are combined into a single colour identifier, by shifting each colour component to it's proper position, and OR'ing them together, $\zeta'_n = \zeta_n^{R'} | \zeta_n^{G'} | \zeta_n^{B'}$.

$\zeta'_n$ is then the colour used to draw an individual neuron on a cluster map of a problem domain.

Figure 3:
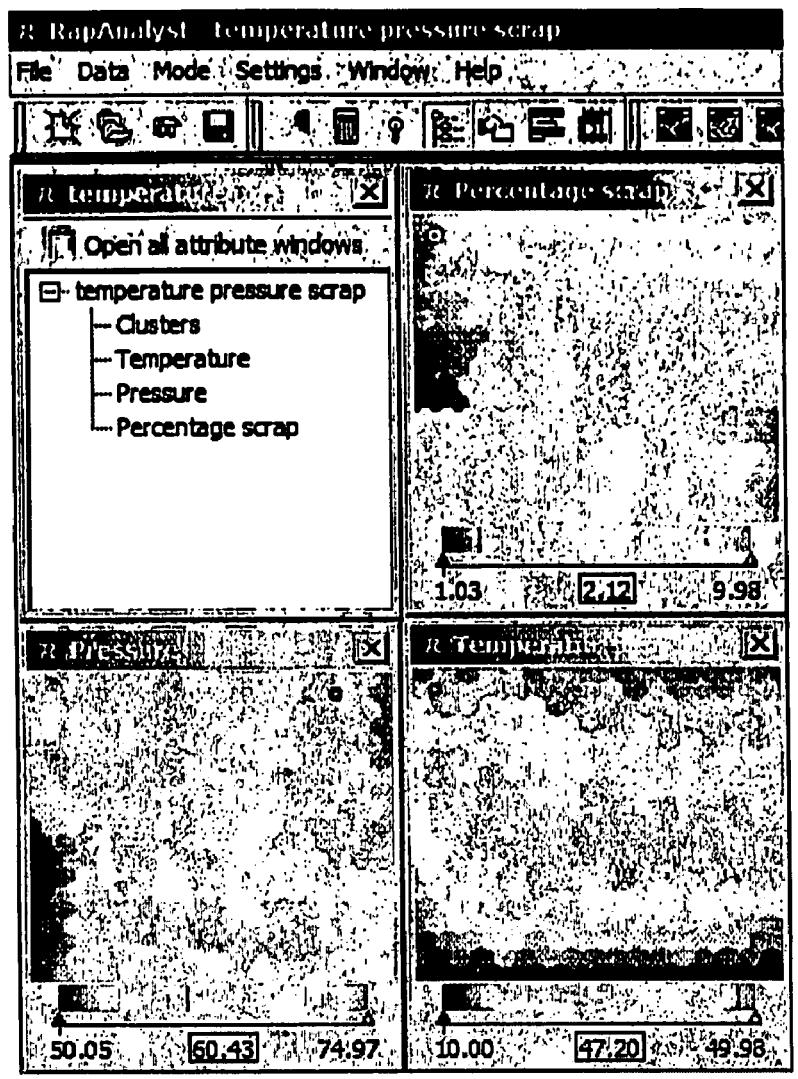
FIG. 3 is an example screen shot of TfrmCompCol and a TfrmSMF of the data analysis system, in accordance with an embodiment of the present invention.

In accordance with another embodiment, map visualisation may be used. Map visualisation may be performed using the TfrmCompCol class, as described in the above class definition section. The structure of the data analysis system is such that several instances of the TfrmCompCol class can be active as MDIChildren within the TfrmMain MDIParent window. Any running instance should be able to dispatch GUI updates on an ad hoc basis. To this extent, a TfrmCompCol instance will be linked to a TfrmSMF instance, and the TfrmSMF will act as a message server. All GUI updates that are not relative to a specific map, will be sent to the TfrmCompCol's associated TfrmSMF, which will broker the requested update as necessary. FIG. 3 shows an example of a TfrmSMF (caption: ReactorSpecs) and a number of component windows. Any change or GUI request that affects every component window, is sent the TfrmSMF instance, which in turn updates all the visible component windows, this allowing for some degree of optimisation. Compared to the processing overhead needed to determine map associations from sources other than a rigidly maintained data structure with direct links to all related windows, (such as getting a list of open windows using the WinAPI, and determining form the list what open windows are available, and which of these are part of the currently shown map), this design choice provides a desirable outcome.

Example functionality originating from a component map that is not brokered by the TfrmSMF, are updates of the position within the map that is shown on the status bar, indicating a relative position as the mouse is moved. FIG. 3 is an example screen shot of TfrmCompCol's and a TfrmSMF of the data analysis system. Each component window in FIG. 3 (TfrmCompCol instance) is responsible for reporting the following events to the TfrmSMF instance, which will relay it to all the shown windows (including the request initiator):

selection of a specific node (shown in figure three—The black dots on the component maps) and decoding of the actual map location selected. (This has to be done by a component map, as individual maps may not be of the same size. Size of the map that was clicked on is used to determine the current position within the map. (Within code this is known as drawing a picking circle);
  displaying labels on the maps. The active TfrmCompCol instance is responsible for obtaining the label string as well as the font, be it the default or some other font indicated by the user. This information is sent, along with the relative position on the map where the user right clicked to add the label. A relative position is passed to the TfrmSMF, as all displayed TfrmCompCol instances may again not be of the same dimension. This will ensure that labels appear on the proper position on the maps;

selection of individual nodes, if Selection Mode is active. Each individual node is sent to the TfrmSMF. It in turn instructs every shown component map to select the node selected by the calling component map;

updates of passed neurons if either PathMode_I or Path-Mode_II is active. Depending on the active mode, each component map will be responsible for drawing the necessary visual cues; and updating the selected position indicator on a component form's colour bar (This is only an indicator that the position has to be updated—Each individual window has to calculate exactly where the indicator should be drawn).

Figure 4:
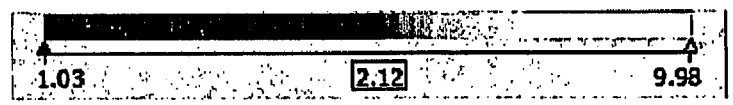
FIG. 4 is an example component map colour bar, in accordance with an embodiment of the present invention.

Component maps may show colours that are present on their respective colour bars. The cluster map may also show a grayed-out color bar. In FIG. 4, an example component map colour bar is shown. The colouring of the component maps process is as follows (This applies to all component colour maps, as well as the U-Matrix, Frequency and Quantization Error maps):

After completion of the training process, a 'colour index' associated with each map position is calculated. This calculation is based on scaling the final component value in a specific position to an index within the available colour range. (The available colour range, such as is shown in FIG. 4, is a set of hard coded constants. During the development phase of this part of the system, ft was decided that these values were unlikely to change, and can therefore be hardcoded.) Scaling is done using the following process:

Let $\overline{w}_{x,y_i}$ be the component value of the i'th component of the neuron at position (x,y) in the final neuron map.

Let $\overline{\omega}_{MAX_i}$ and $\overline{\omega}_{MIN_i}$ be the respective component value maximum and minimum values. (Depending on where the calculation is done, these values may be the actual maximum and minimum values extracted from the original training data, or be as simple as the values 0 and 1, which would be the case if the scaled values used during training are considered.)

$$\overline{w}'_{x,y_i} = \left( \frac{\overline{w}'_{x,y_i}}{\overline{\omega}_{MAX_i} - \overline{\omega}_{MIN_i}} - \frac{\overline{\omega}_{MIN_i}}{\overline{\omega}_{MAX_i} - \overline{\omega}_{MIN_i}} \right) . C_{fact} \text{ yields } \overline{w}'_{x,y_i}$$

is an index values into the range of available colours. Cfact the number of available colours.

The calculated colour index is used as an index into the set of available colours, and the colour indicated by the index is then used to draw the hexagon at the proper position.

As stated, the above approach is also used for colours used in frequency and quantization error maps. As these maps usually have a much smaller value range than needs to be mapped to a visual colour range, differences in node values are much more accentuated.

In one embodiment, the process of calculating the current position on the colour may be used. The process of converting the mouse cursor location to coordinates values in terms of rows and columns on the map is needed to perform a large part of the functionality exhibited by the TfrmCompCol instance. The colour map shown is a bitmap image that created once before any maps are shown. This map image is then Bitbitted onto the TfrmCompCol canvas, and redrawn as necessary. This was chosen as the implementation as it is faster to redraw portions of a precreated bitmap image, than recalculating and drawing hexagons on an ad hoc basis, though either process, and other suitable methods, are possible.

The process to translate a mouse cursor location into a (row,col) pair of values that can be used by the application is as follows:

Assume that the following values are available, and are up to date:

$n_{rows}$ is the number of rows in the map $n_{cols}$ is the number of columns in the map.

$I_{width}$ is the width of the image reporting mouse moves. ($I_{width}$ is therefore the maximum horizontal mouse position that can be reported.)

$I_{height}$ is the height of the image reporting mouse moves.

$Radius_{Horizontal}$ is the horizontal radius. It signifies the radius of a hexagons, calculated using the current width of the map.

$$\left( \text{It is calculated as } Radius_{Horizontal} = \frac{I_{width}}{n_{cols} * 2} - \sqrt{3} / 2 \right).$$

$Radius_{Vertical}$ is the vertical radius, based on the current height of the image.

$$\left( \text{Calculated as } Radius_{Horizontal} = \frac{I_{width} * 2}{n_{rows} * 3 - 1} \right)$$

($x_{mouse}$, $y_{mouse}$) represents the mouse location.

Note that $Radius_{Vertical}$ and $Radius_{Horizontal}$ need only be recalculated when the map is resized.

To calculate the actual row and column positions, ($a_{row}$ and $a_{col}$ respectively) a reverse order of operations need to be executed, based on the formulas for $Radius_{Vertical}$ and $Radius_{Horizontal}$, while solving for the row and column. It is done as follows, but determining possible drawing coordinates based on row and column calculations:

$c_{column} = x_{mouse} / (Radius_{Horizontal} * 2)$ $$y_{draw} = \frac{1}{2} Radius_{Vertical} + \frac{3}{2} Radius_{Vertical} * Curr_{Row}$$

for $r \in [1, n_{rows}]$

If r is even, calculate $x_{draw}$ as $x_{draw} = Radius_{Horizontal} + c_{column} \cdot Radius_{Horizontal} \cdot 2$, else calculate it as $x_{draw} = c_{column} \cdot Radius_{Horizontal} \cdot 2$ $$y_{draw} = \frac{1}{2} Radius_{Vertical} + \frac{3}{2} Radius_{Vertical} \cdot r$$

if $|y_{draw} - y_{mouse}| \leq Radius_{Horiozontal}$ and $|x_{draw} - x_{mouse}| \leq Radius_{Vertical}$, then take the r and $c_{column}$ as the row and column values of the current mouse position and break the loop, else continue the loop In one embodiment, the process of predicting component values based on a trained SOM is summarised as follows:

For the vector to be predicted, calculate the best matching unit on the map.

Copy the missing values from the best matching unit's vector the vector being predicted from.

Other issues also come into play, as data needs to be scaled to within the same range as is used internally by the map, and then rescaled to be within the ranges of the domain.

Scaling values to the domain of the map is simple, as all map component values are within the range [0,1]. Assuming that $a_i^{max}$ and $a_i^{min}$ respectively represent the maximum and minimum values for component i in the training domain, a component value can be scaled to the map domain using the formula:

$$x'_i = \frac{x_i - a_i^{min}}{a_i^{max} - a_i^{min}}. \quad (22)$$

Applying this formula to each available component of an input vector, it can be scaled to the map domain. In one embodiment, the vector's best matching unit is found using equation (1). Found attribute values are then scaled back to the training domain. (Note that the training domain's maximum and minimum values are used, as they represent the learned subspace of the problem.) 'Scaling back' can be done using the formula:

$$x'_i = x^n(a_i^{max} - a_i^{min}) + a_i^{min} \quad (23)$$

In one embodiment, a predict function is used. The predict function can be implemented in different ways, based on the number of neurons taken into consideration when interpolating new values. The process above resembles an EasyPredict technique, where only the best matching unit of a data pattern is used to determine possible new values. The predict function can however also be done by taking a Neighbourhood of values into consideration. This implies that either a set number of Neighbourhood nodes can be used for interpolation of all nodes within a certain distance of the best matching node (BMU). In one embodiment, the latter technique is implemented in the data analysis system. Note that this calculation only considers nodes in the Neighbourhood of the BMU that lie within the same cluster as the best matching unit.

Nodes may be allowed/disallowed by specifying which components of the currently selected node should be kept constant. The user may also specify that a variance on a component value be allowed.

For the actual determination of which nodes may be allowed, each node in the map is compared to the selected node, and based on the differences between component values, a decision is made. The complete calculation for all nodes is described as follows, where $\bar{c}$ represents the weight vector of the selected node:

For each node in the map, n:
    For each component value of the weight vector $\bar{x}_n$ of unit n,
        Determine the maximum and minimum component values, $a_i^{max}$ and $a_i^{min}$ respectively.
        Retrieve the standard deviation for the current component, $\sigma_i$
        Calculate the allowed variance for this component $\sigma_i^i$, to be $\sigma_i$ if the user chose to allow variance, or 0.0 otherwise.
        If element i is to be kept constant, and $|\bar{x}_{n_i} - \bar{c}_i| \leq \sigma'_i$ then node n is to be allowed.

A log file may used to record the sequence of system events. When starting the application, the following sequence of events takes place:
    ⇒Application->initialize( ) is called
    ⇒FormCreate is called.
    ⇒Validity of license is checked.
    ⇒Application->Run( ), which start processing event triggers in the WinMain processing loop.

When the application is closed, the following sequence takes place:
    ⇒Close request is processed
    ⇒FormClose is called
    ⇒Shutdown date is called, and written to the licensing file.
    ⇒Application is terminated.

In one embodiment, regardless of what the data capturing structure of the logfile is, at the beginning of the file a reference is kept to the last time the application was run. This time can easily be synchronized on application shut down when the licensing file is updated with last usage information. This enforces sequential dates when using the data analysis system. Maintaining the same level of date handling in the logfile allows the application to crossreference dates, to pick any possible tapering with the logfile. Possible, there may also be kept track (in the Registry/license file) of the file date of the logfile, to detect tampering/unauthorised changes.

An example logfile structure is:
    Log file signature (32-bits)
        Last open date (32-bits)
        {Entries}

In accordance with one exemplary embodiment, each entry in the logfile has the format <Key, Value>. This allows the creation of an intelligent lexer and parser that can read a fairly random file format. This gives the application writer more freedom to add different kinds of data to the binary structure of the logfile. In one embodiment, the "Last Open Date" position in the logfile should be written at the same offset. This allows is to be updated and rewritten to disk when it would not be necessary to change the log data, or append to it. Using VCL classes TfileStream and Treader/Twriter, the fmOpenReadWrite file access mode, which is essentially a wrapper for the traditional append made when using the C style primitives defined in <stdio.h>, will allow the system to dynamically update only the a single position in the file.

In one embodiment of the invention, a log is kept of all actions that may be of value to a user/company of the data analysis system. Relevant actions include, but are not limited to:
    Predictions from a file
    Interactive predictions
    Printing of maps One process of maintaining a log file is to define a clear application program interface (API) that allows calls to write directly to the log file, and automatically update the log file structure to maintain its integrity as described above. This will allow single update calls, and different type of updates can be made using this interface. Maintenance of the log file is then supposed to be transparent to the developer.

In one embodiment, the data analysis system uses a specified file format. In order to properly integrate template support into the data analysis system, the following specifications may be included:
    A template selector. Lists all the templates found in the application directory. (All .rdt files, from which the template names are extracted. Possible, if a single template is specified, that template will automatically be opened.) Only templates containing valid license keys (i.e. the same as that contained in pq.dll) may be selected and opened.
    A template editor. (Copy of the one found in the template generator.) Allows editing existing data in the template, as well as adding, deleting etc. Rudimentary copying and pasting, with type aware (numeric, string, discrete values) updates are supported. Allows to save, and export data input tab delimited text format, from which can be trained.

License key update monitor. When there is a valid change in a users license key, (before it expires, using formLic etc.) this update must be reflected in each associated template containing the old license key. The easiest approach would be to assume that all templates are dumped in the application directory. Provision may also be made for the user to specify locations of templates, if it decides to keep them in any other location than the default.

Creation of a UnsupervisedData instance directly from a template. It's important to create it directly from the .rdt file, as this will avoid having unnecessary copies of the same data in memory. For large files, this becomes an issue. This technique will be useful for files involved in the following actions:
Creation of a new knowledge filter.
Time series modelling
Evaluation of external file statistics.
Prediction from a file (to get the data set bounds, size, etc.)
Creation of a TStringList that contains TstringList instances as individual member objects. As the final training file format can be trivially induced from the template, this will NOT be a problem. It will be necessary in the following cases:
Labelling from a template file (.rdt)
Interactive labelling from a template file. (.rdt)

In one embodiment, template usage will be 'always on', i.e., it will be enabled regardless of the type of license key used. This implies that support will have to be added to ensure that actions that are typically associated with the full version of The data analysis system will not be accessible while using the RapViewer version. At the moment, this implies that, in the viewer:
Maps may be created from templates, but not from the 'typical' input files such as .txt and .csv.
All other actions that may typically be done using text files, may still be carried out.

Menu Additions:
File menu option that will allow the opening of a template for editing (Submenu on file, or a completely new subgroup?)
A new toolbar that supports all of this.

In accordance with one embodiment, the results from the training process are stored in a knowledge filter file format. The knowledge filter file format encodes the output from the self-organising map training process, as well as custom information used to speed up information and some of our custom functions. In one exemplary embodiment, the data analysis writes the file format into a Microsoft shared storage object format. The following is an exemplary file format with example comments:

```
<String> Signature "wmb1|wmb2"
<int32> RowCount
<int32> ColCount
<int32> AttributeCount
//Attribute names
#AttributeCount x <String> #AttributeName
// attribute values (som output)
foreach r in [1, #RowCount]
foreach c in [1, #ColCount]
```

-continued

```
foreach a in [1, #AttributeCount]
    <double> weight value
// Statistics vectors
// Minima
#AttributeCount x <double>
//Maxima
#Attributecount x < double>
// averages
#AttributeCount x <double>
// Standard deviations
#AttributeCount x <double>
// Incremental values
#AttributeCount x <double>
// Umatrix information
<double> Minimum value
<double> Maximum value
// umatrix entry for each node in the knowledge filter
#RowCount x #colCount x <double>
// Attribute drawing distances
// i.e. colour indexes used to do colour space
// visualisation
#RowCount x #ColCount x #AttributeCount x <int32>
// Node frequency information
<int32> Maximum frequency
#RowCount x #ColCount x <int32>
// Quantisation Error Information
<double> Minimum value
<double> Maximum value
// values per node
#RowCount x #ColCount x <double>
// Save clustering information
<int32> optimal number of clusters.
<bool> Flag used during visualisation, do not leave out
#RowCount x #ColCount x <int32>
// clustering information for the 50 possible
// cluster configurations
#RowCount x #ColCount x 50 x <int32>
// clustering indicators information.
<int32> #ClusterIndicatorCount
#ClusterIndicatorCount x <double>
```

In one embodiment, an equal distance averaging (EDA) technique is used to perform predictions from a knowledge filter in the data analysis system. Predictions are made from a knowledge filter by finding a single node in the knowledge filter that most closely represents a provided data vector. The process can be summarised, for a knowledge filter F as:

Find the node vector, n in the knowledge filter that most closely represents the input data vector, d, i.e., $$n = \arg\min_{K_{<r,c>}} \{\|K_{<r,c>} - d\|_\rho\}, \forall\, r \in [1, K_R], \forall\, c \in [1, K_C]; \quad (1)$$

replace missing entries in d with the corresponding entries from n.

EDA functions in a fashion similar to the general prediction technique described, but with an alternative to the lookup procedure represented in equation (1). When finding the best matching node n, it may often be the case that multiple nodes may offer an equal results when calculating the alternative Euclidean distance $\|\bullet\|_\rho$. In such a situation, all the equal nodes must be taken into consideration. The procedure above may then be replaced with the following approach:

Find n, using equation (1).

Build a list of knowledge filter nodes values, $\overline{M}$, such that for each element m of $\overline{M}$, $|m-d\|_\rho = 0$.

If $\overline{M}$ is empty (i.e. it contains no elements), replace missing in d with corresponding entries in n. If $\overline{M}$ is not empty, replace each missing entry in d with the average value of the corresponding position of all the elements in $\overline{M}$.

In another embodiment, a logical flow of interface and information for analysis functions is used. In one embodiment, a composite attribute window is used to visualize multiple attributes present in a knowledge filter (and consequently in any dataset) on a single plane. The function is made available through a context menu on the attribute window. The context menu option is only available on attributes that have a default value range [0,1]. (While this limitation is not necessary, but may be used to force the user to adhere to conformance in attribute value ranges).

Figure 5:
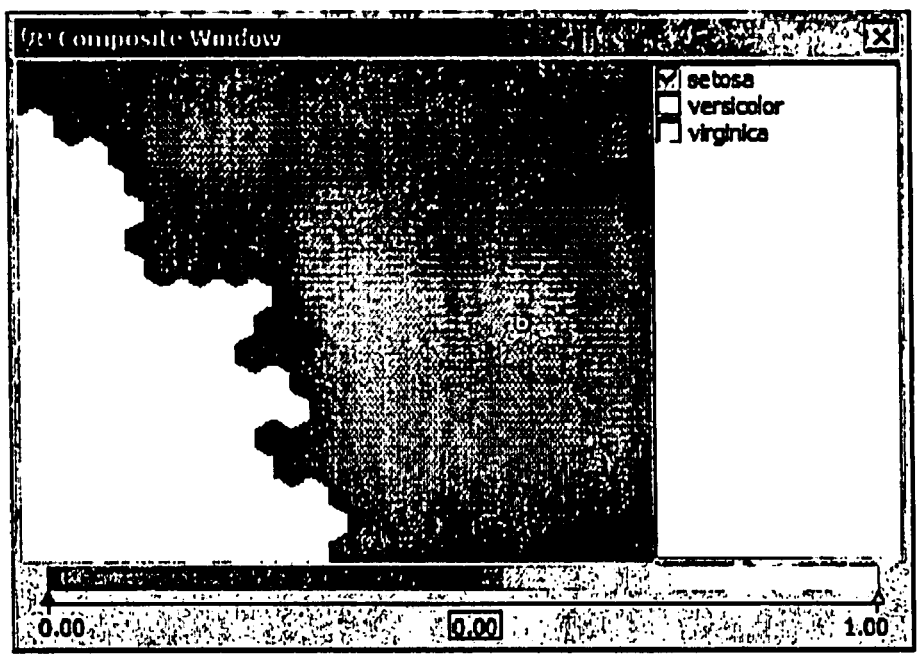
FIG. 5 is an example composite filter showing the concurrent visualization of multiple attributes, in accordance with an embodiment of the present invention.
Figure 6:
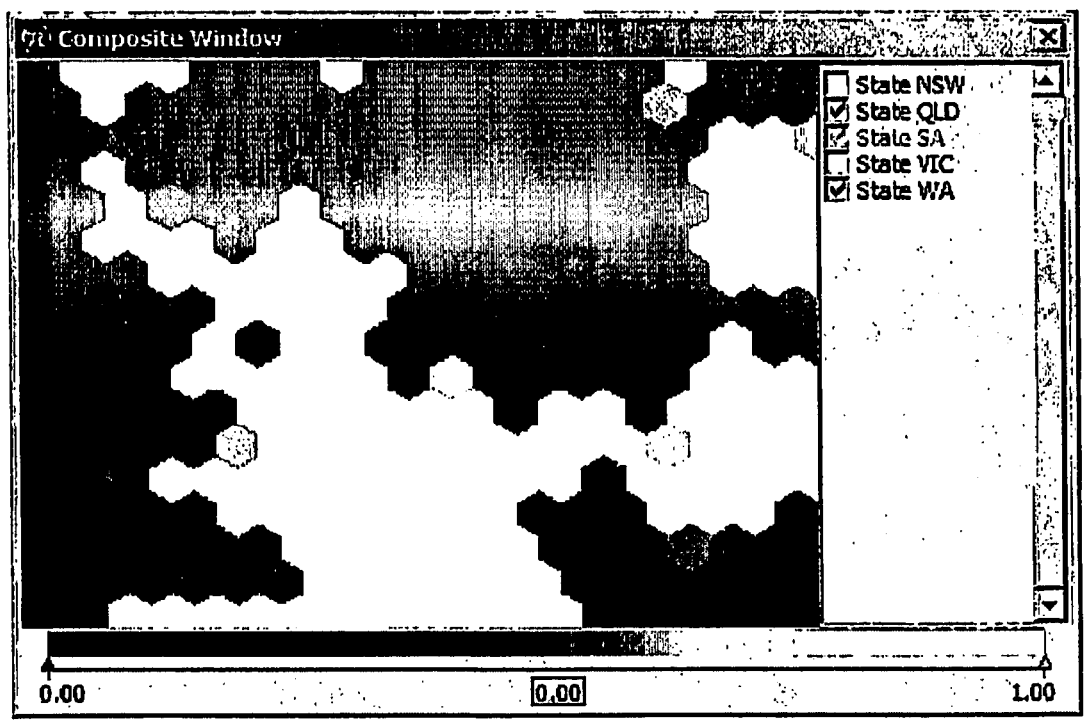
FIG. 6 is a composite filter in a binary attribute window, in accordance with an embodiment of the present invention.

When a number of attributes are visualized on the same attribute window, a new attribute image is created that displays the union of the selected set of attributes. It is done by constructing a new attribute matrix, and selecting the highest value for each attribute value from the chosen set of attributes. An example composite filter showing the concurrent visualization of multiple attributes is shown in FIG. 5. A composite filter in a binary attribute window is shown in FIG. 6. The process can be summarised as follows:

For each attribute, a matrix Cx is defined, where x is defined as the index of an attribute. A specific row and column value for an attribute is represented by $Cx_{[r,c]}$. In the composite attribute window, the graph drawing algorithm (discussed above) finds the highest (and consequently the required) by calculating:

$$Cc_{[r,c]} = \min\{Ca1_{[r,c]}, \ldots, Can_{[r,c]}\}.$$

The range {a1:an} defines the selected set of attributes, and [r,c] can be any row and column position in the knowledge filters valid range.

Figure 7:
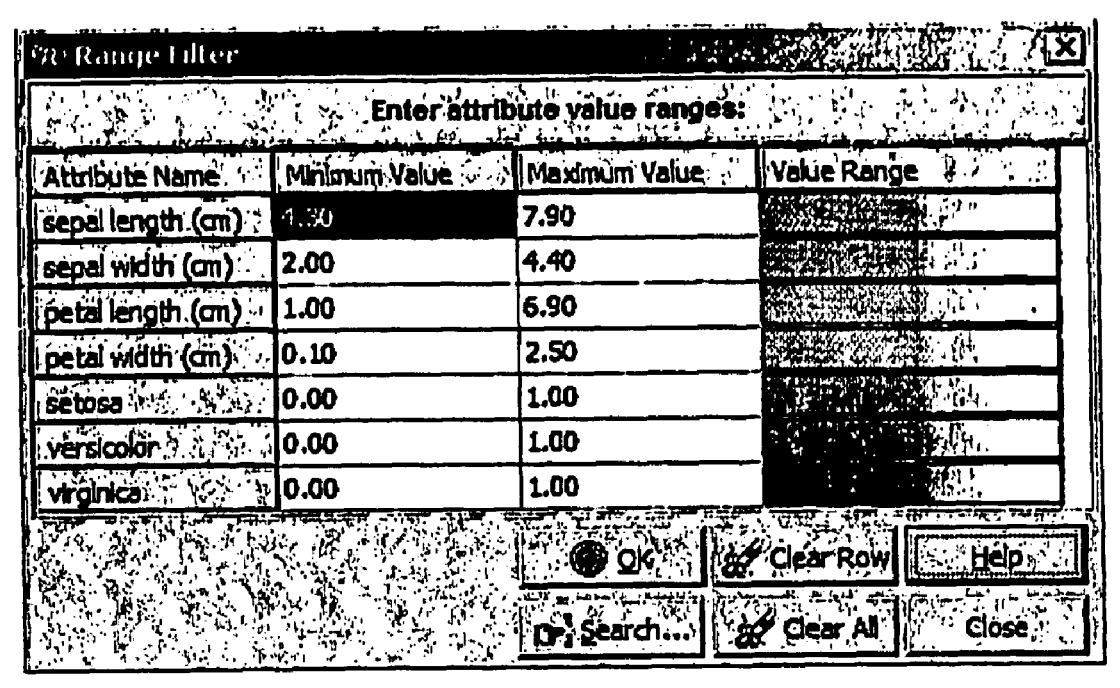

In another embodiment, a range filter allows a user to select regions on a knowledge filter by filtering out nodes based on explicitly defined value ranges. An example range filter interface screen shot is shown in FIG. 7. As can be seen in FIG. 7 an explicit value range can be defined per attribute. Value ranges can also be specified by visually selecting a required range by clicking on the colour bar next to each of the attribute values. When a user selects the "OK" button, the selection active on the knowledge is updated to reflect all the nodes that adhere to the specified value range criteria.

The procedure executed to perform this function, is as follows:

Construct two input vectors, $d^{min}$ and $d^{max}$, respectively containing the minimum and maximum values specified in the visual interface shown above;

Clear any active selection on the knowledge filter;

Any node position <r,c> is added to the active selection, if, $\forall i \in K, d_i^{min} \leq K_{<r,c>_i} \leq d_i^{max}$, for all the non-empty entries in $d^{min}$ and $d^{max}$;

The new selection is drawn on all open attribute windows.

Figure 8:
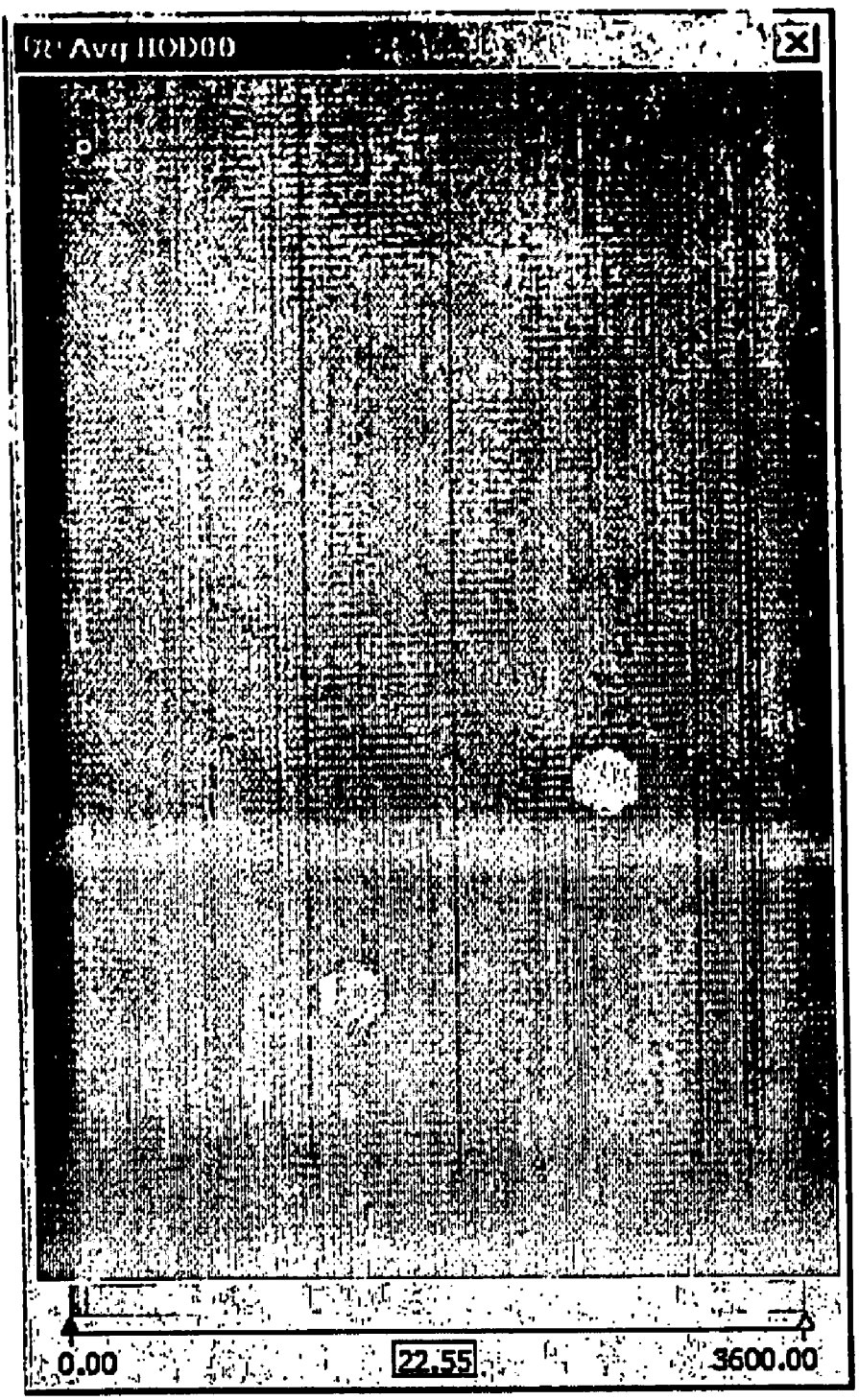
FIG. 8 is an example visualization image of an attribute that contains outlier data, in accordance with an embodiment of the present invention.
Figure 9:
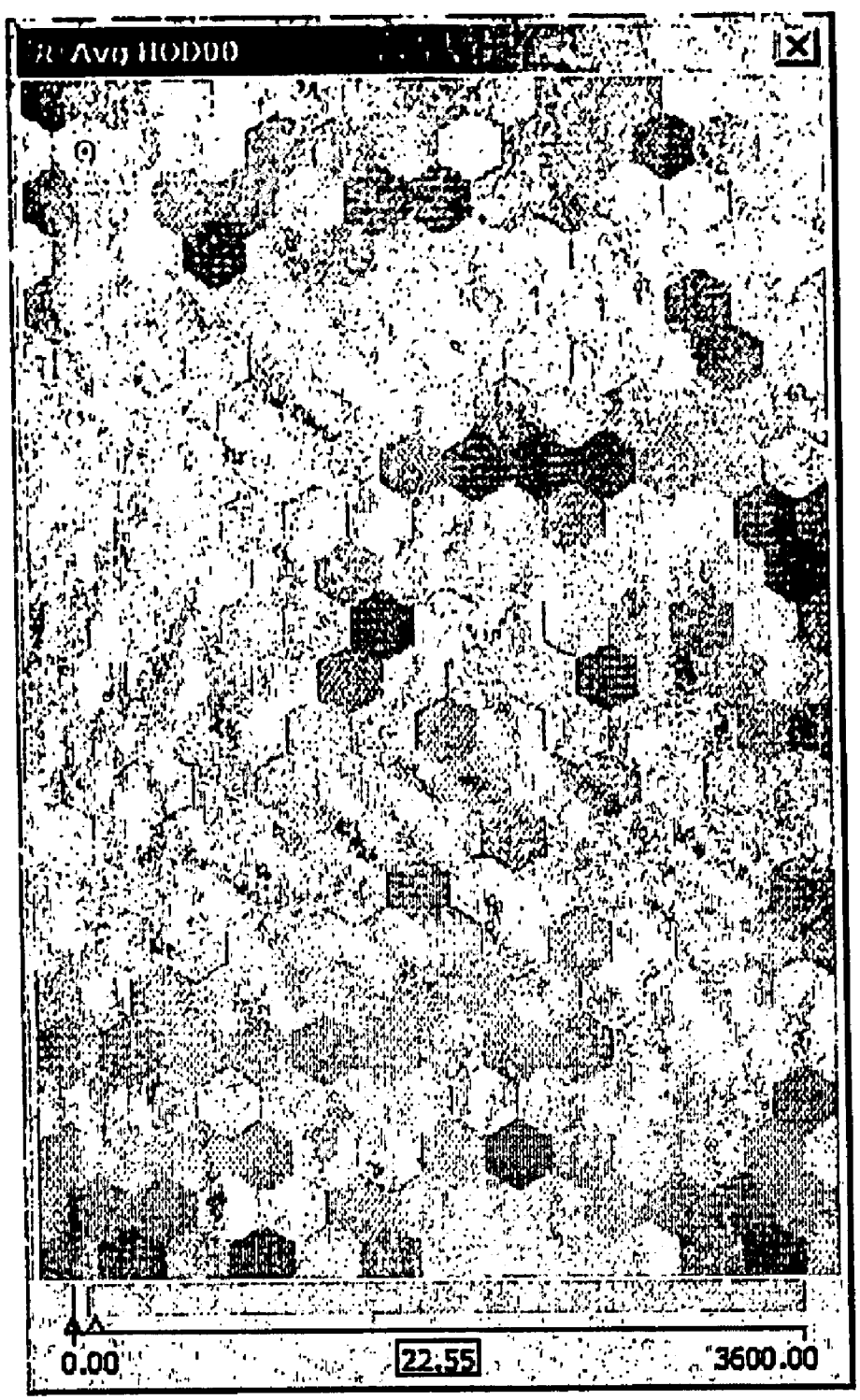
FIG. 9 is an example visualization image with scaling applied, in accordance with an embodiment of the present invention.

In another embodiment, a visual scaling function is used. Visually scaling an attribute window representation allows a user to interactively changes to colour scale used to represent an attribute in a knowledge filter. It is done by changing the minimum and maximum values used to calculate the colour progression used to visualize an attribute. A changed minimum or maximum value results in a re-interpolation of the active colour ranges over the new valid 'range' of attribute values. In FIG. 8, the image shows visualization of an attribute that contains outlier data. A single red node shows where the outlier was placed during training, with the rest of the attribute appearing to be values all close to 0.0. However, when scaling is applied, in FIG. 9, the more convoluted attribute visualization space is identified. This function thus allows the user to easily determine what the true nature of an attribute is relative to the apparent visualized space.

Normally, the colour used to visualize a particular node on an attribute window is found by using the minimum and maximum values found during the training phase of the knowledge filter. Thus the colour index is found by calculating: index_position=$(K_{<r,c>_i} - i_{min})/(i_{max} - i_{min})$. index_position is thus assigned a value in the range used to retrieve an actual colour value from a lookup table.

When creating a scaled attribute image, the calculation is adapted to reflect the new minimum and maximum values. $S_{min}$ and $S_{max}$ are assigned the minimum and maximum values represented by the scaling triangles in the visual interface. We also again explicitly define $i_{min}$ and $i_{max}$ as the minimum and maximum values found for attribute i during training. index_position's calculation is then redefined by the following steps:

If $(K_{<r,c>_i} < S_{min})$, then $i_{min} = S_{min}$;
If $(K_{<r,c>_i} > S_{max})$, then $i_{max} = S_{max}$;
index_position=$(K_{<r,c>_i} - S_{min})/(S_{max} - S_{min})$.

One exemplary labelling process in the data analysis system places labels on a knowledge filter by:

linking attribute columns in the input file to attributes in the knowledge filter;

selecting which attributes from the input file is to be used for labelling;

determining with which row and column each row in the input file is associated; and placing the actual labels on the knowledge filter.

In one embodiment, interactive labelling brings some more intelligence to the process. It allows the user to conditionally place labels on a knowledge filter, based on attribute value specifications entered interactively. The process is approximately the same as for normal labels (as described above) but follows the following logic:

attributes columns from the input data are linked to specific attributes in a knowledge filter;

a window is displayed that allows the user to select a search column, and a set of labelling attributes;

the user can then enter a conditional statement that is used to filter through all the rows in the input data source, and only those rows that adhere to the specified condition is extracted; and the user can choose whether the results are to be placed on the knowledge filter in the form of labels.

In a Search on Attribute section the user may select the attribute that you want to test a condition upon. Next specify the "tests" for when to apply labels by entering a value next to Search for and a Condition that the selected attribute must satisfy. The following table explain how the various condition tests operate:

= Finds attributes that exactly match the value specified.
> Finds attributes that are greater than the specified value.
>= Finds attributes that are greater than or equal to the specified value.
< Finds attributes that are less than, the specified value.
<= Finds attributes that are less than or equal to the specified value.
. . . . Searches the specific attribute value for a partial string match based on the entered value. In the above window, selecting this search condition, specifying 'Surname' as search attribute and entering 'K' in the Search for text box, will return all surnames starting with a 'K'. Entering more characters will refine this search until no more entries in the data file match the specified search criteria. If a numeric attribute is chosen as the search attribute, a textual representation of the actual value is used to match the record using this condition operator.

In a Label using Attributes section the user may select which attributes are applied as labels from the records from the input data file that passes the test you set up. More than one attribute may be specified. Labels will be constructed by using actual values from the input file, separated by commas when more than one attribute has been specified.

In another embodiment, an advanced search function offers functionality similar to that described above for the interactive labelling function. Where interactive labelling is driven by a set of entered labels and a single criteria, advanced search is driven by a set of criteria specified by making a selection on a knowledge filter. The data analysis system then interactively updates the resulting set of rows read from a data source.

The process can be summarised in the following steps:
  a set of data records are read from a data source;
  attribute columns from the dataset is matched to attribute in the knowledge filter; and
  a results window is displayed which lists all the records that are associated with nodes that are part of the active selection on a knowledge filter.

As the selection on the knowledge filter changes, the set of displayed data records are updated to reflect the new selection.

The complete process followed when using the advanced search function, can be summarised as follows:

1. The user specifies a selection on the knowledge filter. A selection here is a set of nodes, $\overline{N}$, where each element in $\overline{N}$ is a set of row column positions.
2. The user specifies an input file.
3. RapAnalyst reads the file into memory, noting all the column names.
4. RapAnalyst matches columns with names equal to those in the knowledge filter, to the corresponding attributes.
5. The user is allowed to visually specify which column from the input file is linked that which attribute in the knowledge filter.
6. For each record d in the file read to memory in step 2, the following steps are performed:
7. The list of nodes, $\overline{M}$, returned by the EDA prediction function (see above) is calculated.
8. From $\overline{M}$, the set of row-column position of each element in $\overline{M}$ is extracted into the list $\overline{M}^1$.
9. The overlap between $\overline{N}$ and $\overline{M}^1$ is calculated, i.e. $\overline{M}^{11} = \overline{N} \cap \overline{M}^1$.
10. If $\overline{M}^{11}$ is non-empty, a text entry corresponding to d is inserted into the advanced search window.

A results window is displayed which lists all the records that are associated with nodes that are part of the active selection on a knowledge filter.

As the selection on the knowledge filter changes, the set of displayed data records are updated to reflect the new selection. This is done by repeating the process described above from step 6.

In accordance with another embodiment, a zooming function may be used. Zooming into a knowledge filter allows a user to simulate drill-down data analysis with a knowledge filter as its basis. Zooming is best understood when considering the process associated with it. Zooming is performed in the following way:
  an initial knowledge filter is constructed;
  a user can then make a selection of nodes that will form a base reference of interest;
  the user then defines a set of data records from an external data source;
  the set of records are then matched to the knowledge filter; and
  all records that are linked to the matched region is flagged and written to a temporary file.

The temporary file may then be used to construct a new knowledge filter.

The zooming process thus effectively allows the user to focus on a specific region within an existing knowledge filter and perform training only on records that are associated with this region.

In accordance with another embodiment, a Binarisation process may be used. Binarisation is a pre-processing function that automates converting any attribute (even non-numeric and non-scalar attributes) into one or more toggled attribute values. Often, columns containing class information are provided in a text format. Converting this information into a usable format requires manually replacing values with their corresponding numerical representation. For more than two classes and depending on the pre-processing needs, it may also be necessary to add new columns containing class information. Binarisation automates this process.

Figure 10:
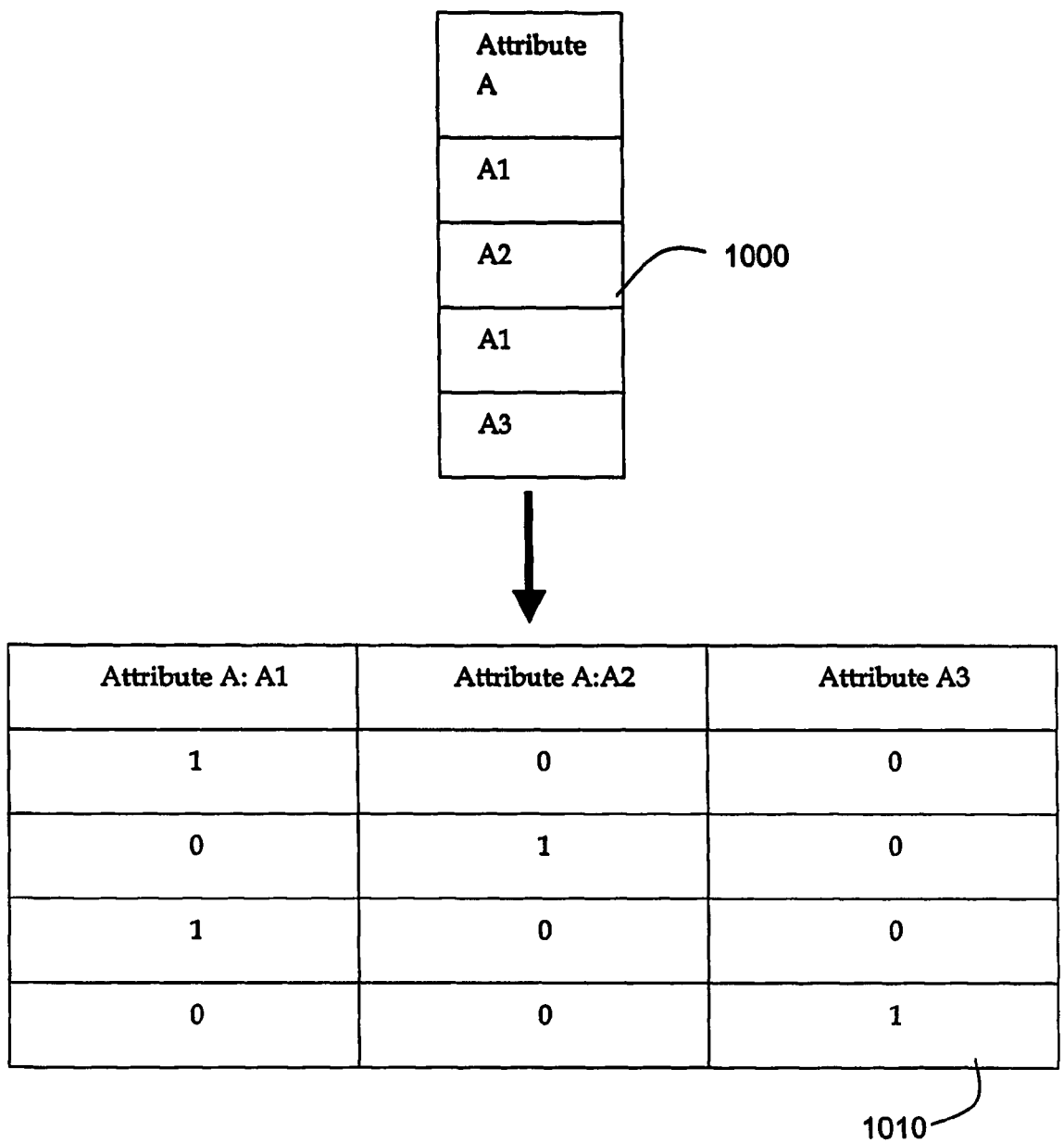
FIG. 10 is an example illustration of the binarisation process, in accordance with an embodiment of the present invention.

In a hypothetical pre-processing task, an attribute column A may contain three classes, A1, A2, and A3. Binarisation will create three new columns in the input data called A1, A2 and A3. New attribute values are determined based on the value present in the original data, with the simple rule that if an entry for A is equal to A1, a value of '1' will placed in the corresponding new column. For the remaining columns, zeroes are inserted. FIG. 10 is an example illustration of the binarisation process, in accordance with an embodiment of the present invention. Initial Table 1000 may be converted to Table 1010 using the binarisation process. Table 1010 is a numerical representation of class information, that can be used to train the knowledge filter creation algorithm.

Figure 11:
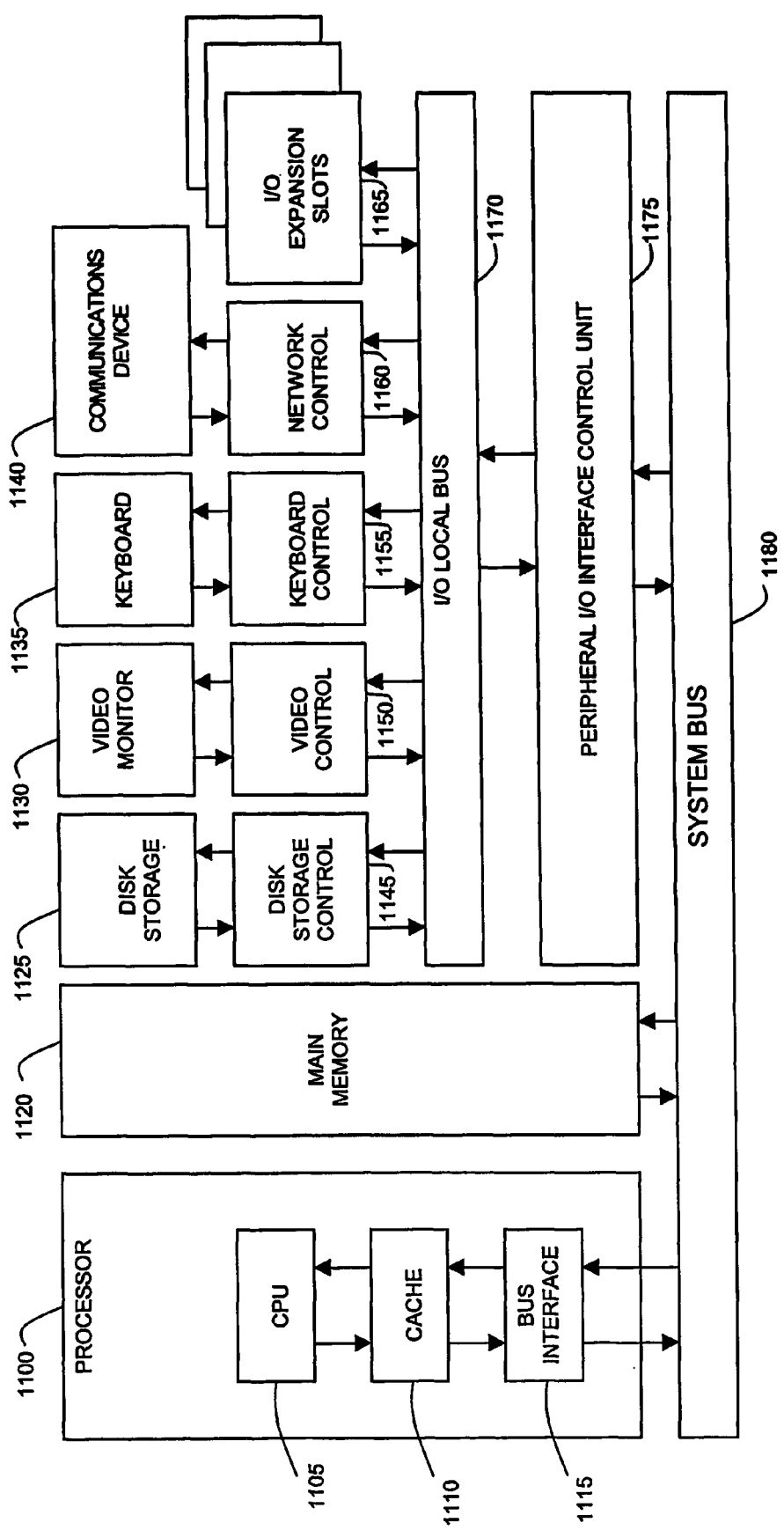
FIG. 11 is a block diagram of an exemplary architecture for a general purpose computer, in accordance with an embodiment of the present invention.

FIG. 11 is a block diagram of an exemplary architecture for a general purpose computer suitable for operating the data analysis system. The illustrated general purpose computer may also be suitable for running applications. A microprocessor 1100, including of a central processing unit (CPU) 1105, a memory cache 1110, and a bus interface 1115, is operatively coupled via a system bus 1180 to a main memory 1120 and an Input/Output (I/O) control unit 1175. The I/O interface control unit 1175 is operatively coupled via an I/O local bus 1170 to a disk storage controller 1145, video controller 1150, a keyboard controller 1155, a network controller 1160, and I/O expansion slots 1165. The disk storage controller 1145 is operatively coupled to the disk storage device 1125. The video controller is operatively coupled to the video monitor 1130. The keyboard controller 1155 is operatively coupled to the keyboard 1135. The network controller 1160 is operatively coupled to the communications device 1140. The communications device 1140 is adapted to allow the network inventory adapter operating on the general purpose computer to communicate with a communications network, such as the internet, a Local Area Network (LAN), a Wide Area Network (WAN), a virtual private network, or a middleware bus, or with other software objects over the communications network, if necessary.

Computer program instructions for implementing the data analysis system may be stored on the disk storage device 1125 until the processor 1100 retrieves the computer program instructions, either in full or in part, and stores them in the main memory 1120. The processor 1100 then executes the computer program instructions stored in the main memory 1120 to implement the features of network inventory adapter.

The program instructions may be executed with a multiprocessor computer having more than one processor.

The general purpose computer illustrated in FIG. 11 is an example of a one device suitable for performing the various functions of the data analysis system. The data analysis system, and any other associated applications, components, and operations, may also run on a plurality of computer, a network server, or other suitable computers and devices.

Other variations may be incorporated into the data analysis system. For example, in one embodiment, the data being analysed may come from more than one source and amalgamation may be used. In such a situation, unique identifiers may be used as key attributes in each data source that links the records together.

In another embodiment, data summarisation may be used to reduce many-to-one relationships into single records. For example, a single customer may have many transactions. Each transaction is a single record. However, the analysis, in one embodiment, is performed is focusing on customers (or certain fixed actors in the data set), not transactions. In such a situation, the many transaction records may be summarised into one customer record by calculating, for each customer, certain record attributes such as, for example, the number of transactions, the total value of all transactions, the time since first transaction, the time since last transaction, the average value of all transactions, the average time between transactions, the number of transactions made during business hours, and any other suitable entries.

In another embodiment, data manipulation may be used to reduce temporal sequences into single records. When subsequent records of data represent readings of values over time and the nature of the progression through time is an important aspect of the investigation, data manipulation is used. The data analysis system effectively considers each data record independently, i.e. the order of the records is not considered. A typical translation performed to combine many rows of data into one row of data containing many different timescales may be as follows:

| Original data | | |
| --- | --- | --- |
| Time (t) | A | B |
| 0 | 2 | 3 |
| 1 | 4 | 5 |
| 2 | 7 | 8 |
| 3 | 9 | 11 |

| Translated data | | | | | |
| --- | --- | --- | --- | --- | --- |
| At | Bt | At-1 | Bt-1 | At-2 | Bt-2 |
| 7 | 8 | 4 | 5 | 2 | 3 |
| 9 | 11 | 7 | 8 | 4 | 5 |

The first row captures readings of A and B at time 2, 1 and 0 and the second row encapsulates time 3, 2 and 1. An alternative approach may calculate new attributes as average percentage change from recent previous records in order to capture the nature of the progression over time in a single record.

In yet another embodiment of the invention, attributes used to train the data analysis system are considered to be scalar variables. Scalar variables are those where the value is measured according to some scale. Temperature, speed and percentage are all examples of scalar variables. Similarly, a survey with 3 possible responses where 1 is disagree, 2 is indifferent and 3 is agree would be considered a scalar variable—because conceptually 2 belongs between 1 and 3, i.e. in this case 2 is better than 1 but not as good as 3. Accordingly, in this embodiment, data may be converted from binary and non-scalar data to scalar data for analysis.

The previous description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

The invention claimed is:

1. A method of computer data analysis using neural networks, the method including:
generating a data representation using a data set, the data set including a plurality of attributes wherein generating the data representation includes:
modifying the data set using a training algorithm, wherein the training algorithm includes growing the data set and wherein growing the data set includes:
finding $K_q$ for each of the data set nodes, where $K_q$ is the node with the highest average quantization error, $$\arg\max_q \{\bar{q}(t)_{K_q}\}$$

for each of the data set nodes, where $$\bar{q}(t)_{K_q} = \frac{1}{t-1} \sum_{t=1}^{t=t-1} q(t)_{K_q}$$

is the average quantization error for node q, where:

$$K_x = \arg\max_x \{\|K_q - K_{<r(q)-1,c(q)>}\|, \|K_q - K_{<r(q)+1,c(q)>}\|\}$$

$$K_y = \arg\max_y \{\|K_q - K_{<r(q),c(q)-1>}\|, \|K_q - K_{<r(q),c(q)+1>}\|\}$$

if $\|K_y - K_c\| < \|K_x - K_c\|$ then
  $n_r = r(y)$ if $r(y) < r(c)$, else $n_r = r(c)$; and
  $n_c = c(y)$
else $n_r = r(y)$; $n_c = c(x)$ if $c(x) c(c)$, else $n_c = c(c)$;
inserting a new row and column after row $n_r$ and column $n_c$; and
interpolating new attribute values for the newly inserted node vectors using:

$$K_{<r,n_c>} = (K_{<r,n_c-1>} + K_{<r,c_n+1>})\frac{\alpha}{2} \text{ and}$$

$$K_{<n_r,c>} = (K_{<n_r-1,c>} + K_{<n_r+1,c>})\frac{\alpha}{2},$$

where $a \in U(0,1)$.

performing convergence testing, wherein convergence testing checks for convergence of the training algorithm;

repeating the modification of the data set until convergence of the training algorithm occurs; and displaying one or more subsets of the data set using the data representation.

2. The method according to claim 1, further including generating the data set using input data, wherein generating the data set includes formatting the input data, and initializing the formatted input data.

3. The method according to claim 2, wherein formatting the input data further includes creating a container class including a list of data vectors, $\overline{D}$, where $d_i$ is the ith vector in $\overline{D}$, and $d_{i,j}$ is the jth element of vector i.

4. The method according to claim 2, wherein formatting the input data further includes data scaling and binarisation of at least a portion of the data set.

5. The method according to claim 4, wherein data scaling includes replacing each element in each data vector in the data set by a scaled representation of itself, where:

$\forall i \in [1, \text{card}(d)], \forall d_i \in \overline{D}$: and $d_{i,j} = (d_{i,j} - i_{min})/(i_{max} - i_{min})$.

6. The method according to claim 4, wherein binarisation includes converting attributes into one or more toggled attribute values.

7. The method according to claim 1, wherein performing convergence testing includes testing condition $q(t)<Q_e$.

8. The method according to claim 2, wherein initializing the formatted input data includes:

calculating an autocorrelation matrix, $\aleph$ over the input data set $\overline{D}$, $$\aleph = \frac{1}{\text{card}(\overline{D})} \sum_{\forall d \in \overline{D}} d \cdot d^T;$$

finding two longest eigenvectors of $\aleph$, $e_1$ and $e_2$, where $|e_1 > e_2|$; and initializing vector values of each element of the data set F by spanning it with element values of the eigenvectors.

9. The method according to claim 8, wherein initializing the vector values includes:

$F_{<F_R,0>} := 0;$ $F_{<F_R,F_C>} := e_1;$ $F_{<1,F_C>} := e_1 + e_2;$ $F_{<F_R,F_C>} := e_2;$ $\forall c \in [2, F_C - 1], F_{<1,c>} := \frac{F_C}{F_C - c} F_{<1,F_C>} + \frac{F_C - c}{F_C} F_{<1,1>};$ $\forall c \in [2, F_C - 1], F_{<R_C,c>} := \frac{c}{F_C} F_{<F_R,F_C>} + \frac{F_C - c}{F_C} F_{<F_R,1>};$ $\forall r \in [2, F_R - 1], F_{<r,1>} := \frac{c}{F_R} F_{<F_R,1>} + \frac{F_R - r}{F_R} F_{<1,1>};$ $\forall r \in [2, F_R - 1], F_{<r,F_C>} := \frac{r}{F_R} F_{<F_R,F_C>} + \frac{F_R - r}{F_R} F_{<r,F_R>};$ and $\forall r \in [2, F_R - 1], \forall c \in [2, F_C - 1], F_{<r,c>} := \frac{c}{F_C} F_{<r,F_C>} + \frac{F_C - c}{F_C} F_{<r,1>}.$ 10. The method according to claim 1, wherein the training algorithm further includes:

$t=t+1;$ $\forall d \in \overline{D};$ if (t<50 or afterGrow)

$$d = \underset{<r,c>, \forall r \in [1,F_R], \forall c \in [1,F_C]}{\arg \min} \|d - F_{<r,c>}\|_\rho$$

afterGrow=false else $d$=FindSCWS(d)

call function: FindNeighborhoodPatterns($\overline{\wp}$)

call function: Batch UpdateMatchVectors $$q(t) = \frac{1}{\text{card}(\overline{D})} \sum_i (\|d - F_{\wp d}\|\rho); \text{ and}$$

if (MayGrow(t) and t<$t_{max}$), call function: GrowKF.

11. The method according to claim 1, wherein displaying one or more subsets of the data set includes:

using a composite view to view multiple attributes; and creating an additional attribute image, wherein the additional attribute image displays a union of a selected set of attributes.

12. The method according to claim 11, wherein using a composite view further includes:

constructing an attribute matrix; and selecting a highest value for each attribute value from the selected set of attributes.

13. The method according to claim 1, wherein displaying one or more subsets of the data set includes using a range filter, wherein using the range filter includes:

selecting regions on the data representation; and filtering out nodes based on defined value ranges.

14. The method according to claim 1, wherein displaying one or more subsets of the data set includes using a zooming function, wherein using the zooming function includes:

making a selection of nodes to form a base reference of interest;

defining a set of data records from a second data set;

matching the second data set to the data representation;

flagging all records that are linked to the matched region; and generating a second data representation using the flagged records.

15. The method according to claim 1, wherein displaying one or more subsets of the data set includes:

using visual scaling;

changing the minimum and maximum values used to calculate a color progression used to visualize at least one of the plurality of attributes; and re-interpolating the active color ranges over the new valid range of attribute values.

16. The method according to claim 1, wherein displaying one or more subsets of the data set includes using a labeling engine, wherein using the labeling engine includes:

linking attribute columns in an input file to attributes in the data representation;

selecting attributes from the input file to be used for labeling;

determining with which row and column each row in the input file is associated; and placing labels on the data representation.

17. The method according to claim 1, wherein displaying one or more subsets of the data set includes using an advanced search function, wherein using the advanced search function includes to:

reading a set of data records from a data source;

matching attribute columns from the set of data records to attributes in the data representation; and displaying a list of all records that are associated with nodes that are part of the active selection on the data representation.

18. The method according to claim 1, wherein displaying one or more subsets of the data set includes using equal distance averaging (EDA), wherein using the equal distance averaging includes:

finding the node vector, n, in the data representation that most closely represents the input data vector, d, where $$n = \arg\min_{K_{<r,c>}} \{\|K_{<r,c>} - d\|_\rho\},$$

$\forall r \in [1, K_R], \forall c \in [1, K_C]$; and replacing missing entries in d with the corresponding entries from n.

19. The method according to claim 18, wherein using the equal distance averaging further includes:

building a list of the data representation nodes values, $\overline{M}$, such that for each element m of $\overline{M}$, $\|m-d\|_\rho=0$; wherein if $\overline{M}$ is empty, then replace each missing entry in d with corresponding entries in n; and if $\overline{M}$ is not empty, then replace each missing entry in d with the average value of the corresponding position of all the elements in $\overline{M}$.

20. The method according to claim 1, wherein the data representation is a knowledge filter.

21. A method of computer data analysis using neural networks, the method including:

generating a data set, $\overline{D}$, the data set including a plurality of attributes and a plurality of data set nodes;

initializing the data set, wherein initializing the data set includes:

calculating an autocorrelation matrix, $\aleph$ over the input data set $\overline{D}$, $$\aleph = \frac{1}{\text{card}(\overline{D})} \sum_{\forall d \in \overline{D}} d \cdot d^T;$$

finding two longest eigenvectors of $\aleph$, $e_1$ and $e_2$, where $|e_1| > |e_2|$; and initializing vector values of each element of a data representation F by spanning it with element values of the eigenvectors;

generating a data representation using a training algorithm, wherein the training algorithm includes growing the data set, and wherein growing the data set includes:

finding $K_q$ for each of the data set nodes, where $K_q$ is the node with the highest average quantization error, $$\arg\max_q \{\overline{q}(t)_{K_q}\}$$

for each of the data set nodes, where $$\overline{q}(t)_{K_q} = \frac{1}{t-1} \sum_{t=1}^{t=t-1} q(t)_{K_q}$$

is the average quantization error for node q, where:

$$K_x = \arg\max_x \{\|K_q - K_{<r(q)-1,c(q)>}\|, \|K_q - K_{<r(q)+1,c(q)>}\|\}$$

$$K_y = \arg\max_y \{\|K_q - K_{<r(q),c(q)-1>}\|, \|K_q - K_{<r(q),c(q)+1>}\|\}$$

if $\|K_y-K_x\| < \|K_x-K_c\|$ then $n_r=r(y)$ if $r(y)<r(c)$, else $n_r=r(c)$; and $n_c=c(y)$;

else $n_r=r(y)$; $n_c=c(x)$ if $c(x)<c(c)$, else $n_c=c(c)$ inserting a new row and column after row $n_r$ and column $n_c$; and interpolating new attribute values for the newly inserted node vectors using:

$$K_{<r,n_c>} = (K_{<r,n_c-1>} + K_{<r,c_n+1>})\frac{\alpha}{2} \text{ and}$$

$$K_{<n_r,c>} = (K_{<n_r-1,c>} + K_{<n_r+1,c>})\frac{\alpha}{2},$$

where $\alpha \in U(0,1)$;

performing convergence testing, wherein convergence testing checks for convergence of the training algorithm;

repeating the training algorithm until convergence of the training algorithm occurs; and displaying one or more subsets of the data set using the data representation.

22. The method according to claim 21, wherein initializing the vector values further includes:

$F_{<F_R,0>} := 0;$ $F_{<F_R,F_C>} := e_1;$ $F_{<1,F_C>} := e_1 + e_2;$ $F_{<F_R,F_C>} := e_2;$ $\forall c \in [2, F_C - 1], F_{<1,c>} := \frac{F_C}{F_C - c} F_{<1,F_C>} + \frac{F_C - c}{F_C} F_{<1,1>};$ $\forall c \in [2, F_C - 1], F_{<R_C,c>} := \frac{c}{F_C} F_{<F_R,F_C>} + \frac{F_C - c}{F_C} F_{<F_R,1>};$ $\forall r \in [2, F_R - 1], F_{<r,1>} := \frac{c}{F_R} F_{<F_R,1>} + \frac{F_R - r}{F_R} F_{<1,1>};$ $\forall r \in [2, F_R - 1], F_{<r,F_C>} := \frac{r}{F_R} F_{<F_R,F_C>} + \frac{F_R - r}{F_R} F_{<r,F_R>};$ and $\forall r \in [2, F_R - 1], \forall c \in [2, F_C - 1], F_{<r,c>} := \frac{c}{F_C} F_{<r,F_C>} + \frac{F_C - c}{F_C} F_{<r,1>}.$ 23. The method according to claim 21, wherein the training algorithm further includes:
t=t+1;
$\forall d \in \overline{D}$;
if (t<50 or afterGrow)

$$d = \arg\min_{<r,c>, \forall r \in [1, F_R], \forall c \in [1, F_C]} \|d - F_{<r,c>}\|_\rho$$

afterGrow=false
else
$\quad \overline{d}$=FindSCWS(d)
call function: FindNeighborhoodPatterns($\overline{\wp}$)
call function: Batch UpdateMatchVectors $$q(t) = \frac{1}{\text{card}(\overline{D})} \sum_i (\|d - F_{\wp d}\|\rho) \cdot; \text{ and}$$

if (MayGrow(t) and t<$t_{max}$), call function: GrowKF.

24. The method according to claim 21, wherein performing convergence testing includes testing condition q(t)<$Q_e$.

25. The method according to claim 21, wherein displaying one or more subsets of the data set includes:
using a composite view to view multiple attributes; and
creating an additional attribute image, wherein the additional attribute image displays a union of a selected set of attributes.

26. The method according to claim 25, wherein using a composite view further includes:
constructing an attribute matrix; and
selecting a highest value for each attribute value from the selected set of attributes.

27. The method according to claim 21, wherein displaying one or more subsets of the data set includes using a range filters wherein using the range filter includes:
selecting regions on the data representation; and
filtering out nodes based on defined value ranges.

28. The method according to claim 21, wherein displaying one or more subsets of the data set includes using a zooming function, wherein using the zooming function includes:
making a selection of nodes to form a base reference of interest;
defining a set of data records from a second data set;
matching the second data set to the data representation;
flagging all records that are linked to the matched region; and
generating a second data representation using the flagged records.

29. The method according to claim 21, wherein displaying one or more subsets of the data set includes:
using visual scaling;
changing the minimum and maximum values used to calculate a color progression used to visualize at least one of the plurality of attributes; and
re-interpolating the active color ranges over the new valid range of attribute values.

30. The method according to claim 21, wherein displaying one or more subsets of the data set includes using a labeling engine, wherein using the labeling engine includes:
linking attribute columns in an input file to attributes in the data representation;
selecting attributes from the input file to be used for labeling;
determining with which row and column each row in the input file is associated; and
placing labels on the data representation.

31. The method according to claim 21, wherein displaying one or more subsets of the data set includes using an advanced search function, wherein using the advanced search function includes to:
reading a set of data records from a data source;
matching attribute columns from the set of data records to attributes in the data representation; and
displaying a list of all records that are associated with nodes that are part of the active selection on the data representation.

32. The method according to claim 21, wherein displaying one or more subsets of the data set includes using equal distance averaging (EDA), wherein using the equal distance averaging includes:
finding the node vector, n, in the data representation that most closely represents the input data vector, d, where $$n = \arg\min_{K_{<r,c>}} \{\|K_{<r,c>} - d\|_\rho\},$$

$\forall r \in [1, K_R], \forall c \in [1, K_C]$; and
replacing missing entries in d with the corresponding entries from n.

33. The method according to claim 32, wherein using the equal distance averaging further includes:
building a list of the data representation nodes values, $\overline{M}$, such that for each element m of $\overline{M}$, $\|m-d\|_\rho=0$; wherein if $\overline{M}$ is empty, then replace each missing entry in d with corresponding entries in n; and if $\overline{M}$ is not empty, then replace each missing entry in d with the average value of the corresponding position of all the elements in $\overline{M}$.

34. The method according to claim 21, wherein the data representation is a knowledge filter.

35. A system for performing data analysis using neural networks, the system including:
a processor;
a memory coupled to the one or more processors; and
program instructions stored in the memory, the processor being operable to execute the program instructions, wherein the program instructions include processor executable code for executing the steps of:
generating a data representation using a data set, the data set including a plurality of attributes, wherein generating the data representation includes:
modifying the data set using a training algorithm, wherein the training algorithm includes growing the data set; and
performing convergence testing, wherein convergence testing checks for convergence of the training algorithm, and
repeating the modification of the data set until convergence of the training algorithm occurs; and
displaying one or more subsets of the data set using the data representation.

36. The system according to claim 35, wherein performing convergence testing includes testing condition q(t)<$Q_e$.

37. A The system according to claim 35, wherein the training algorithm further includes:
t=t+1;
$\forall d \in \overline{D}$;
if (t<50 or afterGrow)

$$d = \underset{<r,c> \forall r \in [1, F_R], \forall c \in [1, F_C]}{\operatorname{argmin}} \|d - F_{<r,c>}\|_\rho$$

afterGrow=false
else
$\overline{d}$=FindSCWS(d)
call function: FindNeighborhoodPatterns($\overline{\wp}$)
call function: Batch UpdateMatchVectors $$q(t) = \frac{1}{\operatorname{card}(\overline{D})} \sum_i (\|d - F_{\wp d}\|\rho); \text{ and}$$

if (MayGrow(t) and t<it), call function: GrowKF.

38. The system according to claim 35, wherein the program instructions for displaying one or more subsets of the data set further includes processor executable code for executing the steps of:
using a composite view to view multiple attributes; and
creating an additional attribute image, wherein the additional attribute image displays a union of a selected set of attributes.

39. The system according to claim 35, wherein the program instructions further include processor executable code for executing the steps of:
constructing an attribute matrix; and
selecting a highest value for each attribute value from the selected set of attributes.

40. The system according to claim 35, wherein displaying one or more subsets of the data set includes using a range filter, wherein the program instructions further include processor executable code for executing the steps of:
selecting regions on the data representation; and
filtering out nodes based on defined value ranges.

41. The system according to claim 35, wherein displaying one or more subsets of the data set includes using a zooming function, wherein the program instructions further include processor executable code for executing the steps of:
making a selection of nodes to form a base reference of interest;
defining a set of data records from a second data set;
matching the second data set to the data representation;
flagging all records that are linked to the matched region; and
generating a second data representation using the flagged records.

42. The system according to claim 35, wherein displaying one or more subsets of the data set includes using visual scaling, wherein the program instructions further include processor executable code for executing the steps of:
changing the minimum and maximum values used to calculate a color progression used to visualize at least one of the plurality of attributes; and
re-interpolating the active color ranges over the new valid range of attribute values.

43. The system according to claim 35, wherein displaying one or more subsets of the data set includes using a labeling engine, wherein the program instructions further include processor executable code for executing the steps of:
linking attribute columns in an input file to attributes in the data representation;
selecting attributes from the input file to be used for labeling;
determining with which row and column each row in the input file is associated; and
placing labels on the data representation.

44. The system according to claim 35, wherein displaying one or more subsets of the data set includes using an advanced search engine, wherein the program instructions further include processor executable code for executing the steps of:
reading a set of data records from a data source;
matching attribute columns from the set of data records to attributes in the data representation; and
displaying a list of all records that are associated with nodes that are part of the active selection on the data representation.

45. The system according to claim 35, wherein displaying one or more subsets of the data set includes using equal distance averaging (EDA), wherein the program instructions further include processor executable code for executing the steps of:
finding the node vector, n, in the data representation that most closely represents the input data vector, d, where $$n = \arg\min_{K_{<r,c>}} \{\|K_{<r,c>} - d\|_\rho\},$$

$\forall r \in [1, K_R], \forall c \in [1, K_C]$; and
replacing missing entries in d with the corresponding entries from n.

46. The system according to claim 45, wherein the program instructions further include processor executable code for executing the steps of:
building a list of the data representation nodes values, $\overline{M}$, such that for each element m of $\overline{M}$, $\|m-d\|_\rho$=0; wherein if $\overline{M}$ is empty, then replace each missing entry in d with corresponding entries in n; and if $\overline{M}$ is not empty, then replace each missing entry in d with the average value of the corresponding position of all the elements in $\overline{M}$.

47. The system according to claim 35, wherein the data representation is a knowledge filter.

48. A computer program product for computer data analysis using neural networks, the computer program product including:
computer-readable program code for generating a data representation using a data set, the data set including a plurality of attributes, wherein generating the data representation includes:
modifying the data set using a training algorithm, wherein the training algorithm includes growing the data set;
performing convergence testing, wherein convergence testing checks for convergence of the training algorithm; and
repeating the training algorithm until convergence of the training algorithm occurs; and
computer-readable program code for displaying one or more subsets of the data set using the data representation.

49. An apparatus for performing data analysis using neural networks, the apparatus including:

means for representing a data set, the data set including a plurality of attributes;

means for generating the representation means using the data set, wherein generating the representation means includes:

modifying the data set using a training algorithm, wherein the training algorithm includes growing the data set;

performing convergence testing, wherein convergence testing checks for convergence of the training algorithm; and repeating the modification of the data set until convergence of the training algorithm occurs; and means for displaying one or more subsets of the data set using the modified data representation.

* * * * *